United States Patent
Höhne et al.

(10) Patent No.: US 12,335,880 B2
(45) Date of Patent: Jun. 17, 2025

(54) APPARATUS, METHOD, AND COMPUTER PROGRAM FOR POWER CONTROL

(71) Applicant: Nokia Technologies Oy, Espoo (FI)

(72) Inventors: Thomas Höhne, Helsinki (FI); István Z. Kovács, Aalborg (DK); Mads Lauridsen, Gistrup (DK); Ingo Viering, Munich (DE)

(73) Assignee: Nokia Technologies Oy, Espoo (FI)

( * ) Notice: Subject to any disclaimer, the term of this patent is extended or adjusted under 35 U.S.C. 154(b) by 546 days.

(21) Appl. No.: 17/626,170

(22) PCT Filed: Aug. 7, 2019

(86) PCT No.: PCT/FI2019/050578
§ 371 (c)(1),
(2) Date: Jan. 11, 2022

(87) PCT Pub. No.: WO2021/023910
PCT Pub. Date: Feb. 11, 2021

(65) Prior Publication Data
US 2022/0248348 A1  Aug. 4, 2022

(51) Int. Cl.
*H04W 52/52* (2009.01)
*H04W 52/24* (2009.01)

(52) U.S. Cl.
CPC ......... *H04W 52/52* (2013.01); *H04W 52/242* (2013.01)

(58) Field of Classification Search
CPC .................................................... H04W 52/52
See application file for complete search history.

(56) References Cited

U.S. PATENT DOCUMENTS

| | | | |
|---|---|---|---|
| 5,924,015 A | * | 7/1999 | Garrison ............. H04W 52/343 455/427 |
| 6,763,006 B1 | | 7/2004 | Lockett |
| 6,771,929 B1 | | 8/2004 | Nivens et al. |
| 2016/0037456 A1 | | 2/2016 | Antia et al. |

FOREIGN PATENT DOCUMENTS

| | | |
|---|---|---|
| EP | 1244228 A2 | 9/2002 |
| WO | 2021/037327 A1 | 3/2021 |

OTHER PUBLICATIONS

"3rd Generation Partnership Project; Technical Specification Group Radio Access Network; Solutions for NR to support non-terrestrial networks (NTN) (Release 16)", 3GPP TR 38.821, V0.6.0, Apr. 2019, pp. 1-55.

(Continued)

*Primary Examiner* — Hsinchun Liao
(74) *Attorney, Agent, or Firm* — Barta Jones, PLLC

(57) ABSTRACT

An apparatus comprising: at least one processor; and at least one memory including computer program code; the at least one memory and the computer program code configured to, with the at least one processor, cause the apparatus at least to: determine (602) at least one power setting adjustment for at least one terminal based on at least one gain setting adjustment for a satellite; and provide (604) the least one power setting adjustment for the at least one terminal to the at least one terminal.

19 Claims, 10 Drawing Sheets

(56) References Cited

OTHER PUBLICATIONS

Winton et al., "The Transponder—A Key Element in ESA Spacecraft TTC Systems", European Space Agency, Retrieved on Jan. 4, 2022, Webpage available at : https://www.esa.int/esapub/bulletin/bullet86/wint86.htm.

"Performance and availability objectives for fixed-satellite service telemetry, tracking and command systems", Recommendation ITU-R S.1716, 2005, pp. 1-18.

"3rd Generation Partnership Project; Technical Specification Group Radio Access Network; NR; Physical layer procedures for data (Release 15)", 3GPP TS 38.214, V15.5.0, Mar. 2019, pp. 1-103.

"3rd Generation Partnership Project; Technical Specification Group Radio Access Network; NR; Physical layer procedures for control (Release 15)", 3GPP TS 38.213, V15.5.0, Mar. 2019, pp. 1-104.

Bryan et al., "JavaScript Object Notation (JSON) Patch", RFC 6902, Internet Engineering Task Force (IETF), Apr. 2013, pp. 1-18.

"3rd Generation Partnership Project; Technical Specification Group Radio Access Network; NR; Radio Resource Control (RRC) protocol specification (Release 15)", 3GPP TS 38.331, V15.6.0, Jun. 2019, pp. 1-519.

International Search Report and Written Opinion received for corresponding Patent Cooperation Treaty Application No. PCT/FI2019/050578, dated Apr. 6, 2020, 12 pages.

Office action received for corresponding European Patent Application No. 19758790.0, dated Aug. 12, 2024, 3 pages.

* cited by examiner

APPARATUS, METHOD, AND COMPUTER PROGRAM FOR POWER CONTROL

RELATED APPLICATION

This application was originally filed as PCT Application No. PCT/FI2019/050578 on Aug. 7, 2019, each of which is incorporated herein by reference in its entirety.

FIELD OF THE DISCLOSURE

The present disclosure relates to an apparatus, a method, and a computer program for managing at least one power setting for at least one terminal in a non-terrestrial network.

BACKGROUND

A communication system can be seen as a facility that enables communication sessions between two or more entities such as user terminals, base stations/access points and/or other nodes by providing carriers between the various entities involved in the communications path. A communication system can be provided for example by means of a communication network and one or more compatible communication devices. The communication sessions may comprise, for example, communication of data for carrying communications such as voice, electronic mail (email), text message, multimedia and/or content data and so on. Non-limiting examples of services provided comprise two-way or multi-way calls, data communication or multimedia services and access to a data network system, such as the Internet. In a wireless communication system at least a part of a communication session between at least two stations occurs over a wireless link.

A user can access the communication system by means of an appropriate communication device or terminal. A communication device of a user is often referred to as user equipment (UE) or user device. A communication device is provided with an appropriate signal receiving and transmitting apparatus for enabling communications, for example enabling access to a communication network or communications directly with other users. The communication device may access a carrier provided by a station or access point, and transmit and/or receive communications on the carrier.

The communication system and associated devices typically operate in accordance with a required standard or specification which sets out what the various entities associated with the system are permitted to do and how that should be achieved. Communication protocols and/or parameters which shall be used for the connection are also typically defined. One example of a communications system is 2G system (2GS) using global system for mobile communications (GSM) radio access technology, 3G system (3GS) using universal mobile telecommunications system (UMTS) radio access technology, 4G system (4GS) using long-term evolution-advanced (LTE-A) radio access technology or 5G system (5GS) using new radio (NR) radio access technology.

SUMMARY

According to an aspect there is provided an apparatus comprising at least one processor and at least one memory including computer code for one or more programs, the at least one memory and the computer code configured, with the at least one processor, to cause the apparatus at least to: determine at least one power setting adjustment for at least one terminal based on at least one gain setting adjustment for a satellite; and provide the least one power setting adjustment for the at least one terminal to the at least one terminal.

The determining the at least one power setting adjustment for the at least one terminal based on the at least one gain setting may be based on information received from the satellite.

The at least one gain setting adjustment for the satellite may comprise at least one uplink gain setting adjustment for the satellite, at least one downlink gain setting adjustment for the satellite and/or at least one difference between an uplink gain setting adjustment for the satellite and a downlink gain setting adjustment for the satellite.

The at least one uplink gain setting adjustment for the satellite may comprise at least one of an uplink reception gain setting adjustment on an access link or an uplink transmission gain setting adjustment on a feeder link; or the at least one downlink gain setting adjustment for the satellite may comprise at least one of an downlink reception gain setting adjustment on a feeder link or a downlink transmission gain setting adjustment on an access link.

The at least one power setting adjustment for the at least one terminal may comprise at least one uplink power setting adjustment.

The at least one power setting adjustment for the at least one terminal may be provided to the at least one terminal via at least one broadcast signal or at least one dedicated signal.

The at least one power setting adjustment for the at least one terminal may be specific for a terminal or generic for a plurality of terminals.

The at least one power setting adjustment for the at least one terminal may be specific for a channel or a reference signal or generic for a plurality of channels and/or a plurality of reference signals.

The at least one power setting adjustment for the at least one terminal specific for a channel or a reference signal may comprise a $P_{0\_PUSCH}$, $P_{0\_PUCCH}$, $P_{0\_PRACH}$ or a $P_{0\_SRS}$ parameter adjustment.

The at least one power setting adjustment for the at least one terminal may be generic for all channels and reference signals and/or all terminals in a cell.

The at least one power setting adjustment for the at least one terminal may comprises at least one of a power offset adjustment for the terminal, a pathloss offset adjustment for the terminal or an information about satellite gain setting adjustment for the terminal.

The at least one memory and the computer program code may be configured to, with the at least one processor, cause the apparatus at least to: receive measurements collected at the satellite; and determine the at least one gain setting adjustment for the satellite based on the measurements.

The at least one memory and the computer program code may be configured to, with the at least one processor, cause the apparatus at least to: provide the at least one gain setting adjustment for the satellite to the satellite.

The at least one memory and the computer program code may be configured to, with the at least one processor, cause the apparatus at least to: receive the at least one gain setting adjustment for the satellite determined at the satellite.

The apparatus may be a base station.

The base station may be coupled to the satellite via a gateway.

According to an aspect there is provided an apparatus comprising circuitry configured to: determine at least one power setting adjustment for at least one terminal based on at least one gain setting adjustment for a satellite; and provide the least one power setting adjustment for the at least one terminal to the at least one terminal.

The determining the at least one power setting adjustment for the at least one terminal based on the at least one gain setting may be based on information received from the satellite.

The at least one gain setting adjustment for the satellite may comprise at least one uplink gain setting adjustment for the satellite, at least one downlink gain setting adjustment for the satellite and/or at least one difference between an uplink gain setting adjustment for the satellite and a downlink gain setting adjustment for the satellite.

The at least one uplink gain setting adjustment for the satellite may comprise at least one of an uplink reception gain setting adjustment on an access link or an uplink transmission gain setting adjustment on a feeder link; or the at least one downlink gain setting adjustment for the satellite may comprise at least one of an downlink reception gain setting adjustment on a feeder link or a downlink transmission gain setting adjustment on an access link.

The at least one power setting adjustment for the at least one terminal may comprise at least one uplink power setting adjustment.

The at least one power setting adjustment for the at least one terminal may be provided to the at least one terminal via at least one broadcast signal or at least one dedicated signal.

The at least one power setting adjustment for the at least one terminal may be specific for a terminal or generic for a plurality of terminals.

The at least one power setting adjustment for the at least one terminal may be specific for a channel or a reference signal or generic for a plurality of channels and/or a plurality of reference signals.

The at least one power setting adjustment for the at least one terminal specific for a channel or a reference signal may comprise a $P_{0\_PUSCH}$, $P_{0\_PUCCH}$, $P_{0\_PRACH}$ or a $P_{0\_SRS}$ parameter adjustment.

The at least one power setting adjustment for the at least one terminal may be generic for all channels and reference signals and/or all terminals in a cell.

The at least one power setting adjustment for the at least one terminal may comprises at least one of a power offset adjustment for the terminal, a pathloss offset adjustment for the terminal or an information about satellite gain setting adjustment for the terminal.

The at least one memory and the computer program code may be configured to, with the at least one processor, cause the apparatus at least to: receive measurements collected at the satellite; and determine the at least one gain setting adjustment for the satellite based on the measurements.

The apparatus may comprise circuitry configured to: provide the at least one gain setting adjustment for the satellite to the satellite.

The apparatus may comprise circuitry configured to: receive the at least one gain setting adjustment for the satellite determined at the satellite.

The apparatus may be a base station.

The base station may be coupled to the satellite via a gateway.

According to an aspect there is provided an apparatus comprising means for: determining at least one power setting adjustment for at least one terminal based on at least one gain setting adjustment for a satellite; and providing the least one power setting adjustment for the at least one terminal to the at least one terminal.

The determining the at least one power setting adjustment for the at least one terminal based on the at least one gain setting may be based on information received from the satellite.

The at least one gain setting adjustment for the satellite may comprise at least one uplink gain setting adjustment for the satellite, at least one downlink gain setting adjustment for the satellite and/or at least one difference between an uplink gain setting adjustment for the satellite and a downlink gain setting adjustment for the satellite.

The at least one uplink gain setting adjustment for the satellite may comprise at least one of an uplink reception gain setting adjustment on an access link or an uplink transmission gain setting adjustment on a feeder link; or the at least one downlink gain setting adjustment for the satellite may comprise at least one of an downlink reception gain setting adjustment on a feeder link or a downlink transmission gain setting adjustment on an access link.

The at least one power setting adjustment for the at least one terminal may comprise at least one uplink power setting adjustment.

The at least one power setting adjustment for the at least one terminal may be provided to the at least one terminal via at least one broadcast signal or at least one dedicated signal.

The at least one power setting adjustment for the at least one terminal may be specific for a terminal or generic for a plurality of terminals.

The at least one power setting adjustment for the at least one terminal may be specific for a channel or a reference signal or generic for a plurality of channels and/or a plurality of reference signals.

The at least one power setting adjustment for the at least one terminal specific for a channel or a reference signal may comprise a $P_{0\_PUSCH}$, $P_{0\_PUCCH}$, $P_{0\_PRACH}$ or a $P_{0\_SRS}$ parameter adjustment.

The at least one power setting adjustment for the at least one terminal may be generic for all channels and reference signals and/or all terminals in a cell.

The at least one power setting adjustment for the at least one terminal may comprises at least one of a power offset adjustment for the terminal, a pathloss offset adjustment for the terminal or an information about satellite gain setting adjustment for the terminal.

The at least one memory and the computer program code may be configured to, with the at least one processor, cause the apparatus at least to: receive measurements collected at the satellite; and determine the at least one gain setting adjustment for the satellite based on the measurements.

The apparatus may means for: providing the at least one gain setting adjustment for the satellite to the satellite.

The apparatus may comprise means for: receiving the at least one gain setting adjustment for the satellite determined at the satellite.

The apparatus may be a base station.

The base station may be coupled to the satellite via a gateway.

According to an aspect there is provided a method comprising: determining at least one power setting adjustment for at least one terminal based on at least one gain setting adjustment for a satellite; and providing the least one power setting adjustment for the at least one terminal to the at least one terminal.

The determining the at least one power setting adjustment for the at least one terminal based on the at least one gain setting may be based on information received from the satellite.

The at least one gain setting adjustment for the satellite may comprise at least one uplink gain setting adjustment for the satellite, at least one downlink gain setting adjustment for the satellite and/or at least one difference between an uplink gain setting adjustment for the satellite and a downlink gain setting adjustment for the satellite.

The at least one uplink gain setting adjustment for the satellite may comprise at least one of an uplink reception gain setting adjustment on an access link or an uplink transmission gain setting adjustment on a feeder link; or the at least one downlink gain setting adjustment for the satellite may comprise at least one of an downlink reception gain setting adjustment on a feeder link or a downlink transmission gain setting adjustment on an access link.

The at least one power setting adjustment for the at least one terminal may comprise at least one uplink power setting adjustment.

The at least one power setting adjustment for the at least one terminal may be provided to the at least one terminal via at least one broadcast signal or at least one dedicated signal.

The at least one power setting adjustment for the at least one terminal may be specific for a terminal or generic for a plurality of terminals.

The at least one power setting adjustment for the at least one terminal may be specific for a channel or a reference signal or generic for a plurality of channels and/or a plurality of reference signals.

The at least one power setting adjustment for the at least one terminal specific for a channel or a reference signal may comprise a $P_{0\_PUSCH}$, $P_{0\_PUCCH}$, $P_{0\_PRACH}$ or a $P_{0\_SRS}$ parameter adjustment.

The at least one power setting adjustment for the at least one terminal may be generic for all channels and reference signals and/or all terminals in a cell.

The at least one power setting adjustment for the at least one terminal may comprises at least one of a power offset adjustment for the terminal, a pathloss offset adjustment for the terminal or an information about satellite gain setting adjustment for the terminal.

The at least one memory and the computer program code may be configured to, with the at least one processor, cause the apparatus at least to: receive measurements collected at the satellite; and determine the at least one gain setting adjustment for the satellite based on the measurements.

The method may comprise: providing the at least one gain setting adjustment for the satellite to the satellite.

The method may comprise: receiving the at least one gain setting adjustment for the satellite determined at the satellite.

The method may be performed by a base station.

The base station may be coupled to the satellite via a gateway.

According to an aspect there is provided a computer program comprising computer executable code which when run on at least one processor is configured to: determine at least one power setting adjustment for at least one terminal based on at least one gain setting adjustment for a satellite; and provide the least one power setting adjustment for the at least one terminal to the at least one terminal.

The determining the at least one power setting adjustment for the at least one terminal based on the at least one gain setting may be based on information received from the satellite.

The at least one gain setting adjustment for the satellite may comprise at least one uplink gain setting adjustment for the satellite, at least one downlink gain setting adjustment for the satellite and/or at least one difference between an uplink gain setting adjustment for the satellite and a downlink gain setting adjustment for the satellite.

The at least one uplink gain setting adjustment for the satellite may comprise at least one of an uplink reception gain setting adjustment on an access link or an uplink transmission gain setting adjustment on a feeder link; or the at least one downlink gain setting adjustment for the satellite may comprise at least one of an downlink reception gain setting adjustment on a feeder link or a downlink transmission gain setting adjustment on an access link.

The at least one power setting adjustment for the at least one terminal may comprise at least one uplink power setting adjustment.

The at least one power setting adjustment for the at least one terminal may be provided to the at least one terminal via at least one broadcast signal or at least one dedicated signal.

The at least one power setting adjustment for the at least one terminal may be specific for a terminal or generic for a plurality of terminals.

The at least one power setting adjustment for the at least one terminal may be specific for a channel or a reference signal or generic for a plurality of channels and/or a plurality of reference signals.

The at least one power setting adjustment for the at least one terminal specific for a channel or a reference signal may comprise a $P_{0\_PUSCH}$, $P_{0\_PUCCH}$, $P_{0\_PRACH}$ or a $P_{0\_SRS}$ parameter adjustment.

The at least one power setting adjustment for the at least one terminal may be generic for all channels and reference signals and/or all terminals in a cell.

The at least one power setting adjustment for the at least one terminal may comprises at least one of a power offset adjustment for the terminal, a pathloss offset adjustment for the terminal or an information about satellite gain setting adjustment for the terminal.

The at least one memory and the computer program code may be configured to, with the at least one processor, cause the apparatus at least to: receive measurements collected at the satellite; and determine the at least one gain setting adjustment for the satellite based on the measurements.

The computer program may comprise computer executable code which when run on at least one processor is configured to: provide the at least one gain setting adjustment for the satellite to the satellite.

The computer program may comprise computer executable code which when run on at least one processor is configured to: receive the at least one gain setting adjustment for the satellite determined at the satellite.

The at least one processor may be part of a base station.

The base station may be coupled to the satellite via a gateway.

According to an aspect there is provided an apparatus comprising at least one processor and at least one memory including computer code for one or more programs, the at least one memory and the computer code configured, with the at least one processor, to cause the apparatus at least to: receive at least one power setting adjustment for at least one terminal, wherein the at least one power setting adjustment for the at least one terminal is determined based on at least one gain setting adjustment for a satellite; and adjust at least one power setting based on the at least one power setting adjustment for the at least one terminal.

The at least one power setting for the at least one terminal may comprise at least one uplink transmission power setting.

The at least one power setting adjustment for the at least one terminal may be received via at least one broadcast signal or at least one dedicated signal.

The at least one power setting adjustment for the at least one terminal may be specific for a terminal or generic for a plurality of terminals.

The at least one power setting adjustment for the at least one terminal may be specific for a channel or a reference signal or generic for a plurality of channels and/or a plurality of reference signals.

The at least one power setting adjustment for the at least one terminal specific for a channel or a reference signal may comprise at least one $P_{0\_PUSCH}$, $P_{0\_PUCCH}$, $P_{0\_PRACH}$ or a $P_{0\_SRS}$ parameter adjustment.

The at least one power setting adjustment for the at least one terminal may be generic for all channels and reference signals and/or all terminals in a cell.

According to an aspect there is provided an apparatus comprising circuitry configured to: receive at least one power setting adjustment for at least one terminal, wherein the at least one power setting adjustment for the at least one terminal is determined based on at least one gain setting adjustment for a satellite; and adjust at least one power setting based on the at least one power setting adjustment for the at least one terminal.

The at least one power setting for the at least one terminal may comprise at least one uplink transmission power setting.

The at least one power setting adjustment for the at least one terminal may be received via at least one broadcast signal or at least one dedicated signal.

The at least one power setting adjustment for the at least one terminal may be specific for a terminal or generic for a plurality of terminals.

The at least one power setting adjustment for the at least one terminal may be specific for a channel or a reference signal or generic for a plurality of channels and/or a plurality of reference signals.

The at least one power setting adjustment for the at least one terminal specific for a channel or a reference signal may comprise at least one $P_{0\_PUSCH}$, $P_{0\_PUCCH}$, $P_{0\_PRACH}$ or a $P_{0\_SRS}$ parameter adjustment.

According to an aspect there is provided an apparatus comprising means for: receiving at least one power setting adjustment for at least one terminal, wherein the at least one power setting adjustment for the at least one terminal is determined based on at least one gain setting adjustment for a satellite; and adjusting at least one power setting based on the at least one power setting adjustment for the at least one terminal.

The at least one power setting for the at least one terminal may comprise at least one uplink transmission power setting.

The at least one power setting adjustment for the at least one terminal may be received via at least one broadcast signal or at least one dedicated signal.

The at least one power setting adjustment for the at least one terminal may be specific for a terminal or generic for a plurality of terminals.

The at least one power setting adjustment for the at least one terminal may be specific for a channel or a reference signal or generic for a plurality of channels and/or a plurality of reference signals.

The at least one power setting adjustment for the at least one terminal specific for a channel or a reference signal may comprise at least one $P_{0\_PUSCH}$, $P_{0\_PUCCH}$, $P_{0\_PRACH}$ or a $P_{0\_SRS}$ parameter adjustment.

The at least one power setting adjustment for the at least one terminal may be generic for all channels and reference signals and/or all terminals in a cell.

According to an aspect there is provided a method comprising: receiving at least one power setting adjustment for at least one terminal, wherein the at least one power setting adjustment for the at least one terminal is determined based on at least one gain setting adjustment for a satellite; and adjusting at least one power setting based on the at least one power setting adjustment for the at least one terminal.

The at least one power setting for the at least one terminal may comprise at least one uplink transmission power setting.

The at least one power setting adjustment for the at least one terminal may be received via at least one broadcast signal or at least one dedicated signal.

The at least one power setting adjustment for the at least one terminal may be specific for a terminal or generic for a plurality of terminals.

The at least one power setting adjustment for the at least one terminal may be specific for a channel or a reference signal or generic for a plurality of channels and/or a plurality of reference signals.

The at least one power setting adjustment for the at least one terminal specific for a channel or a reference signal may comprise at least one $P_{0\_PUSCH}$, $P_{0\_PUCCH}$, $P_{0\_PRACH}$ or a $P_{0\_SRS}$ parameter adjustment.

The at least one power setting adjustment for the at least one terminal may be generic for all channels and reference signals and/or all terminals in a cell.

According to an aspect there is provided a computer program comprising computer executable code which when run on at least one processor is configured to: receive at least one power setting adjustment for at least one terminal, wherein the at least one power setting adjustment for the at least one terminal is determined based on at least one gain setting adjustment for a satellite; and adjust at least one power setting based on the at least one power setting adjustment for the at least one terminal.

The at least one power setting for the at least one terminal may comprise at least one uplink transmission power setting.

The at least one power setting adjustment for the at least one terminal may be received via at least one broadcast signal or at least one dedicated signal.

The at least one power setting adjustment for the at least one terminal may be specific for a terminal or generic for a plurality of terminals.

The at least one power setting adjustment for the at least one terminal may be specific for a channel or a reference signal or generic for a plurality of channels and/or a plurality of reference signals.

The at least one power setting adjustment for the at least one terminal specific for a channel or a reference signal may comprise at least one $P_{0\_PUSCH}$, $P_{0\_PUCCH}$, $P_{0\_PRACH}$ or a $P_{0\_SRS}$ parameter adjustment.

The at least one power setting adjustment for the at least one terminal may be generic for all channels and reference signals and/or all terminals in a cell.

According to an aspect, there is provided a computer readable medium comprising program instructions stored thereon for performing at least one of the above methods.

According to an aspect, there is provided a non-transitory computer readable medium comprising program instructions stored thereon for performing at least one of the above methods.

According to an aspect, there is provided a non-volatile tangible memory medium comprising program instructions stored thereon for performing at least one of the above methods.

In the above, many different aspects have been described. It should be appreciated that further aspects may be provided by the combination of any two or more of the aspects described above.

Various other aspects are also described in the following detailed description and in the attached claims.

LIST OF ABBREVIATIONS

AGC: Autonomous Gain Control
BER: Bit Error Rate
BWP: BandWidth Part
DCI: Downlink Control Information
DN: Data Network
DRS: Downlink Reference Signal
EIRP: Equivalent Isotopically Radiated power
E-UTRAN: Evolved Universal Terrestrial Radio Access Network
DL: Downlink
GC-PDCCH: Group Common PDCCH
GEO: Geostationary Earth Orbiting
gNB: gNodeB
GPRS: General Packet Radio Services
GSM: Global System for Mobile communication
GTP: GPRS Tunnelling Protocol
GW: Gateway
IoT: Internet of Things
ITU: International Telecommunication Union
IP: Internet Protocol
L1: Layer 1
L2: Layer 2
LEO: Low Earth Orbiting
LTE: Long Term Evolution
MEO: Medium Earth Orbiting
NR: New Radio
NTN: Non Terrestrial Network
MAC: Medium Access Control
MS: Mobile Station
PDA: Personal Digital Assistant
PDCCH: Physical Downlink Control Channel
PDCP: Packet Data Convergence Protocol
PDU: Packet Data Unit
PHY: Physical
PL: PathLoss
PRACH: Physical Random Access Channel
PRB: Physical Resource Block
PSD: Power Spectral Density
PUCCH: Physical Uplink Control Channel
PUSCH: Physical Uplink Shared Channel
RAM: Random Access Memory
RAN: Radio Access Network
RF: Radio Frequency
RLC: Radio Link Control
ROM: Read Only Memory
RRC: Radio Resource Control
RS: Reference Signal
RSRP: Reference Signal Received Power
SDAP: Service Data Adaptation Protocol
SI: System Information
SRS: Sounding Reference Signal
TC: TeleCommand
TPC: Transmit Power Control
TT&C: Telemetry Tracking and Command
UAS: Unmanned Aircraft System
UDP: User Data Protocol
UE: User Equipment
UL: Uplink
UMTS: Universal Mobile Telecommunication System
UPF: User Plane Function
USB: Universal Serial Bus
3G: $3^{rd}$
3GPP: $3^{rd}$ Generation Partnership Project
4G: $4^{th}$ Generation
5G: $5^{th}$ Generation
5GC: 5G Core network
5GRAN: 5G Radio Access Network
5GS: 5G System

BRIEF DESCRIPTION OF THE FIGURES

Embodiments will now be described, by way of example only, with reference to the accompanying Figures in which.

DETAILED DESCRIPTION OF THE FIGURES

Before explaining in detail the exemplifying embodiments, certain general principles of a non-terrestrial network (NTN) are briefly explained with reference to FIGS. 1a to 1c, 2 and 3 to assist in understanding the technology underlying the described examples.

Figure 1A:
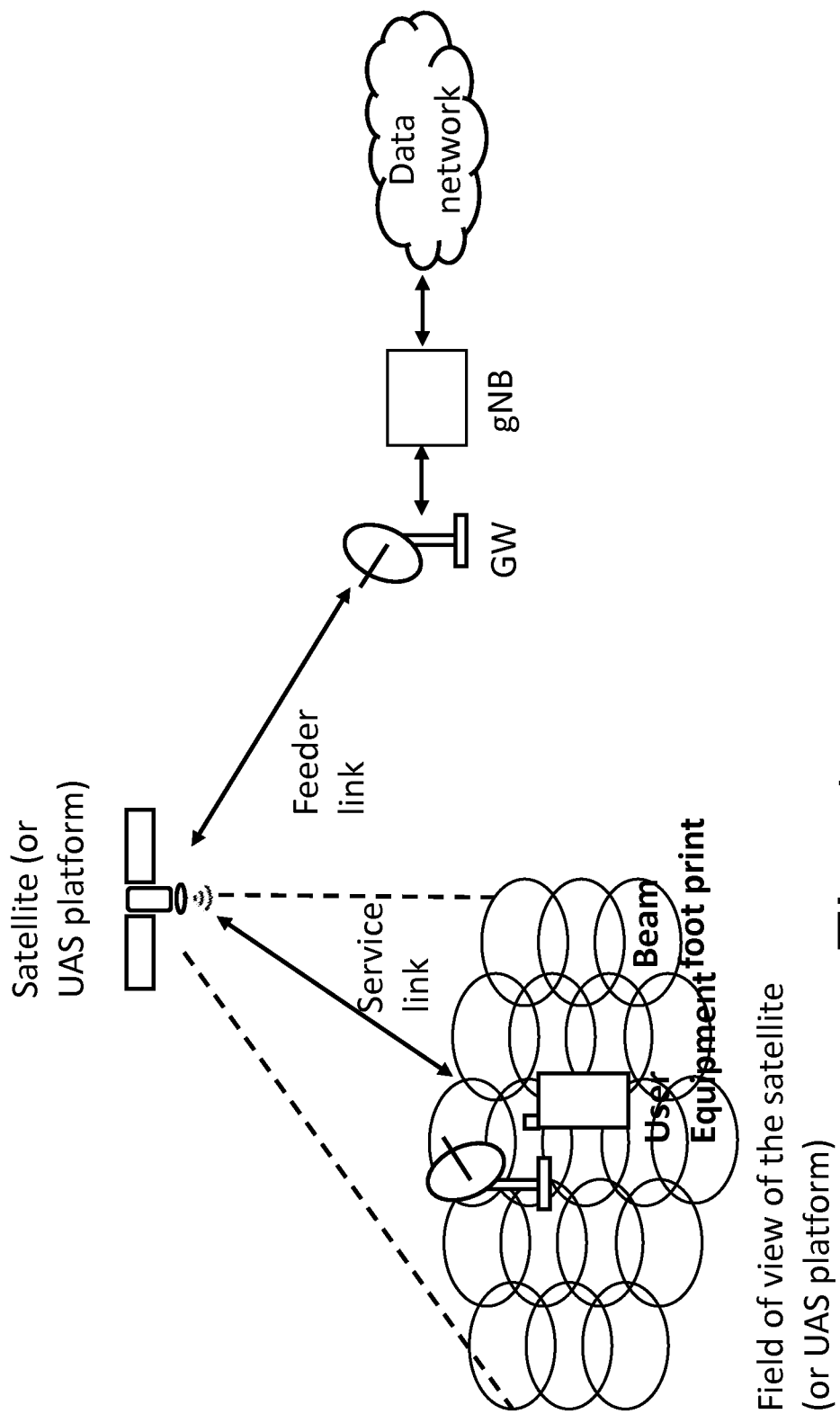
FIG. 1a shows a schematic representation of a non-terrestrial network architecture with transparent satellite.

FIG. 1a shows a schematic representation of a NTN as per TR 38.821 (see FIGS. 4.1-1). The NTN may comprise a user equipment (UE), a service or access link, a satellite or unmanned aircraft system (UAS) platform, a feeder link, a satellite/NTN gateway (GW), a 3GPP base station (gNB) and a data network.

The satellite may not terminate NR-Uu" [TR 38.821]. The satellite may implement a transparent payload. That is, the satellite may implement radio frequency (RF) filtering, conversion and amplification. Hence, the waveform signal repeated by the payload may be unchanged. The satellite may generate radio coverage beams over a given service area bounded by its field of view and on board antenna technology. The footprints of the radio beams are typically of elliptic shape. The field of view of the satellite may depend on an on board antenna diagram and/or minimum elevation angle. One radio beam may be carrying the signals of a NR cell, and several satellite radio beams may be carrying the signals of a single NR cell or of multiple NR cells.

The satellite may be a low earth orbiting (LEO), medium earth orbiting (MEO) or geostationary earth orbiting (GEO) satellite. LEO may refer to orbiting around the earth with an altitude between 300 km and 1500 km. MEO may refer to orbiting between a LEO orbit and a GEO orbit. GEO may refer to orbiting at 35,786 km above the earth's equator and following the direction of the earth's rotation.

The GW may be located on the Earth. The GW may provide sufficient RF power and RF sensitivity for accessing the satellite. The GW may be part of a base station (e.g. gNB) or vice versa or may be connected to a base station (e.g. gNB).

It should be understood that the gNB may be also an eNB, or a node of a future release of a standard that uses power control for UEs. I The feeder link may be a radio link between the GW and the satellite.

The service or access link may be a radio link between the UEs and the satellite. Each UE may have a service or access link to the satellite, which may differ from the other UEs, for instance in its radio propagation characteristics, but also in control and configuration aspects.

Figure 1B:
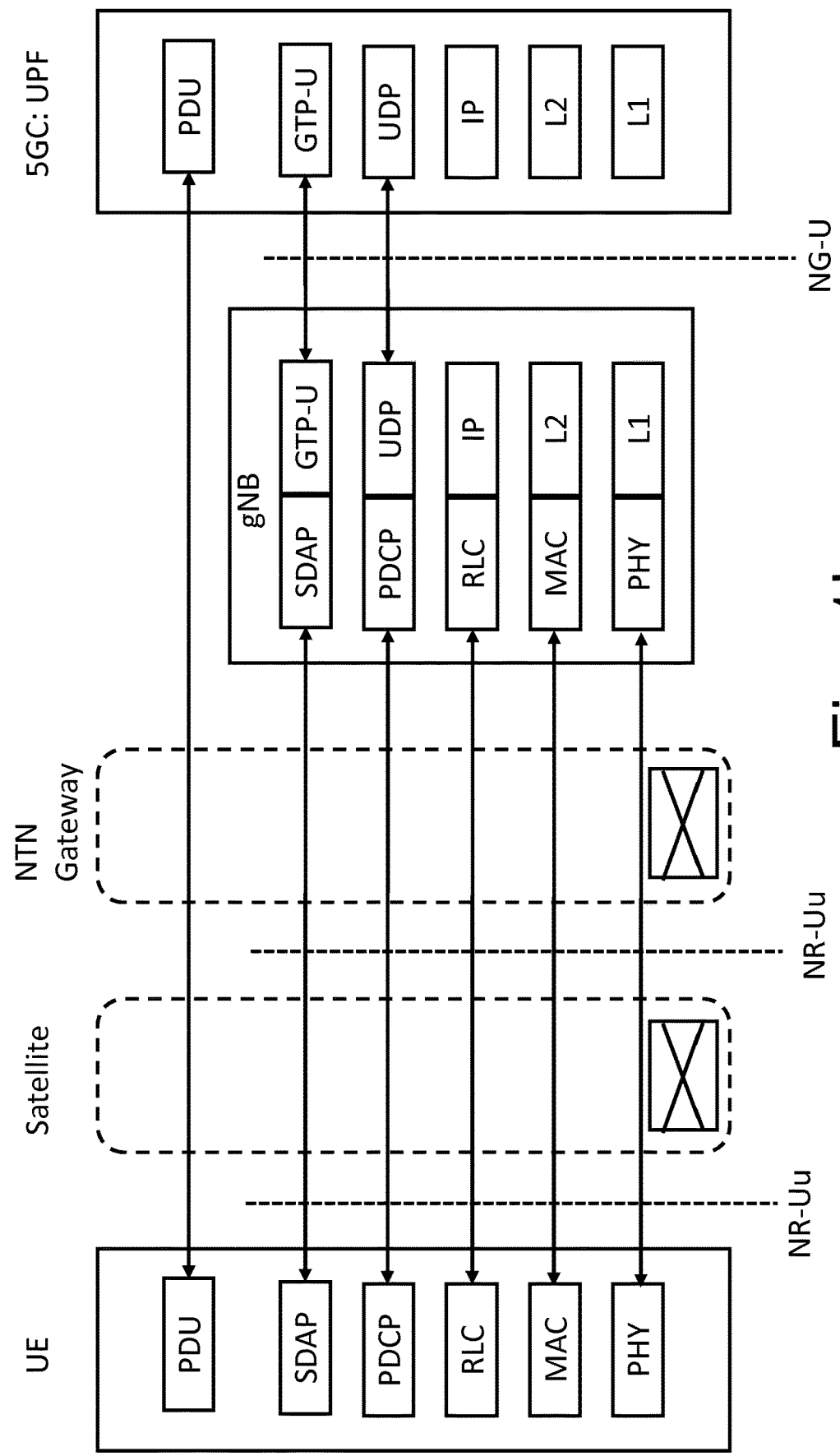
FIG. 1b shows a schematic representation of a user plane protocol stack in a non-terrestrial network comprising a transparent satellite.
Figure 5:
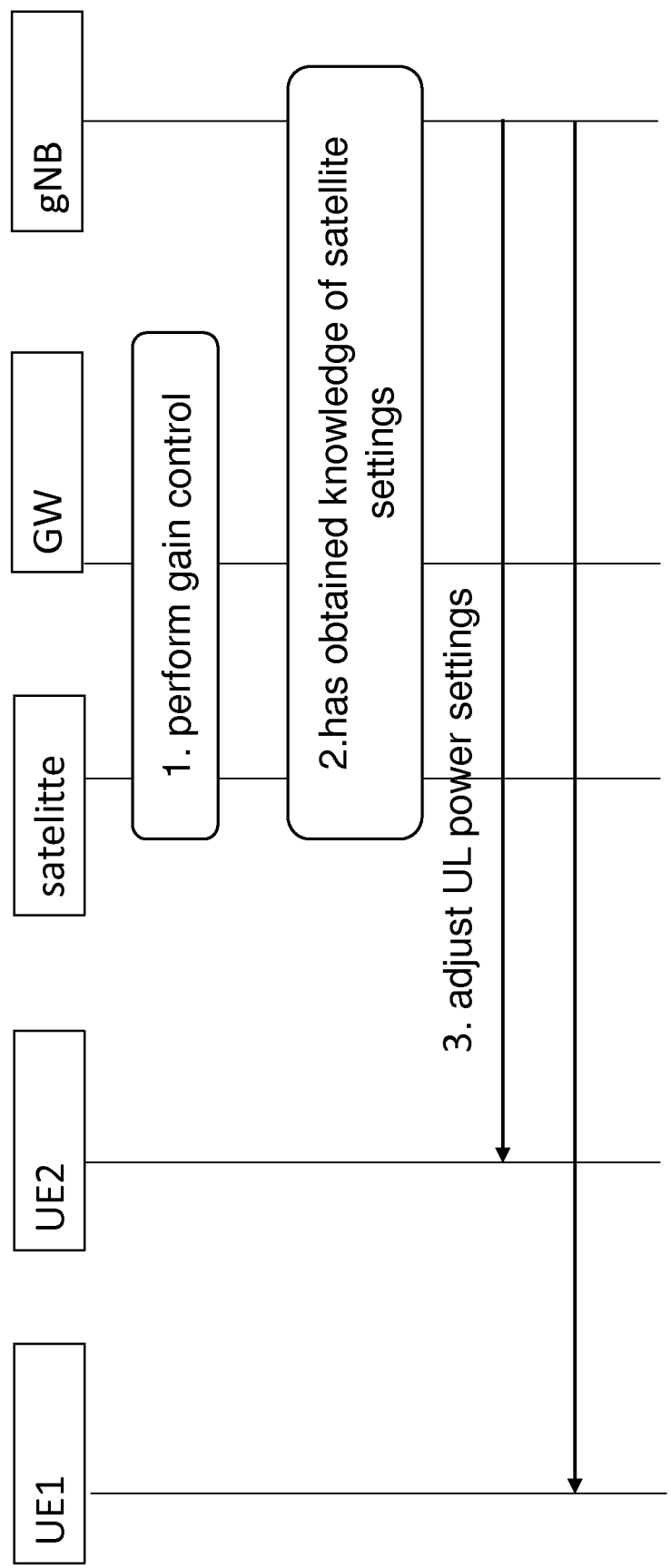
FIG. 5 shows a schematic representation of a signalling diagram of a method of managing at least one power setting for at least one terminal in a non-terrestrial network performed by a gNB.

FIG. 1b shows a schematic representation of a user plane protocol stack in a non-terrestrial network comprising a transparent satellite as per TR 38.821 (see FIGS. 5.1-3).

Figure 1C:
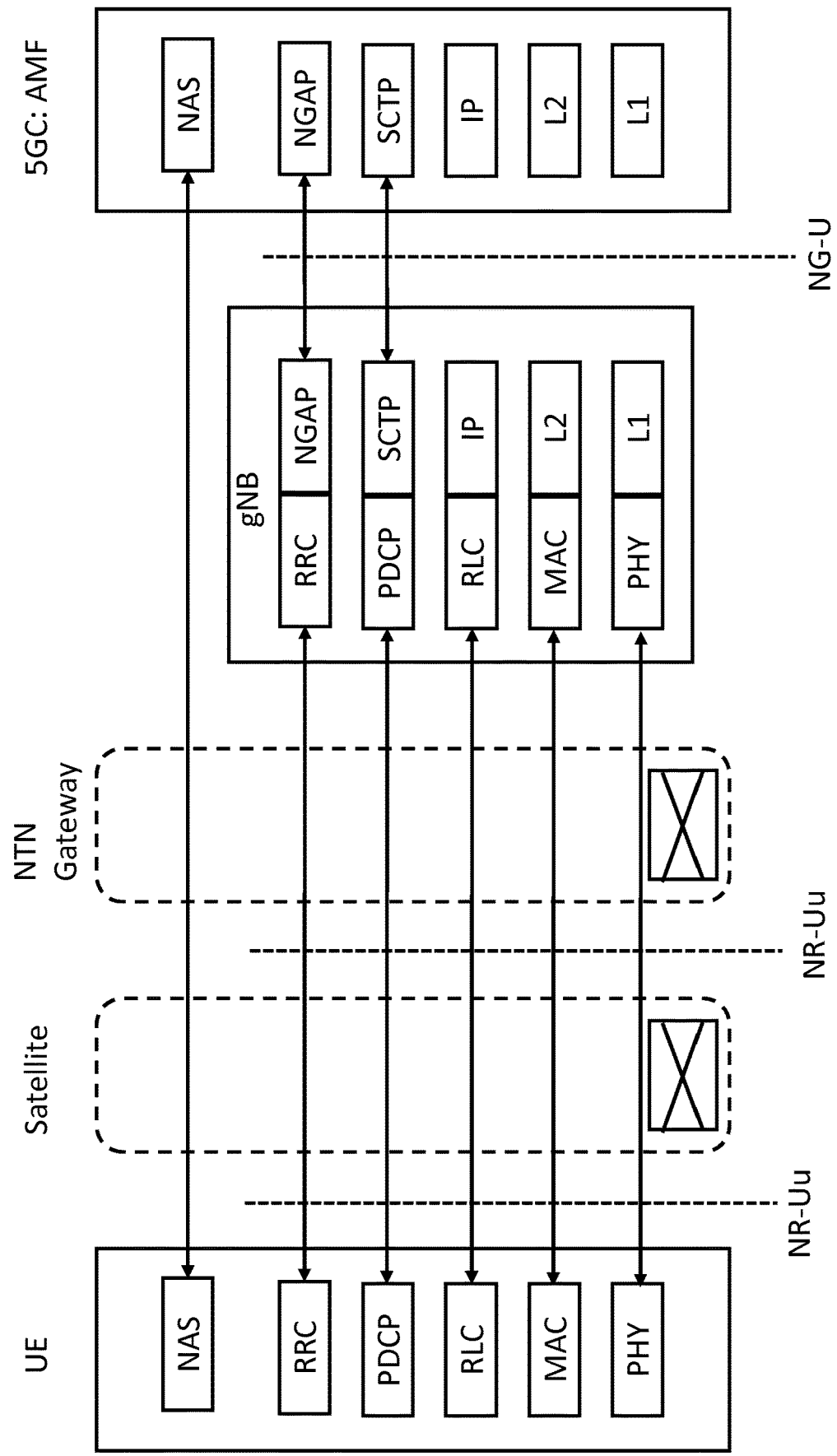
FIG. 1c shows a schematic representation of a control plane protocol stack in a non-terrestrial network comprising a transparent satellite.

FIG. 1c shows a schematic representation of a control plane protocol stack in a non-terrestrial network comprising a transparent satellite as per TR 38.821 (see FIGS. 5.1-4).

Figure 2:
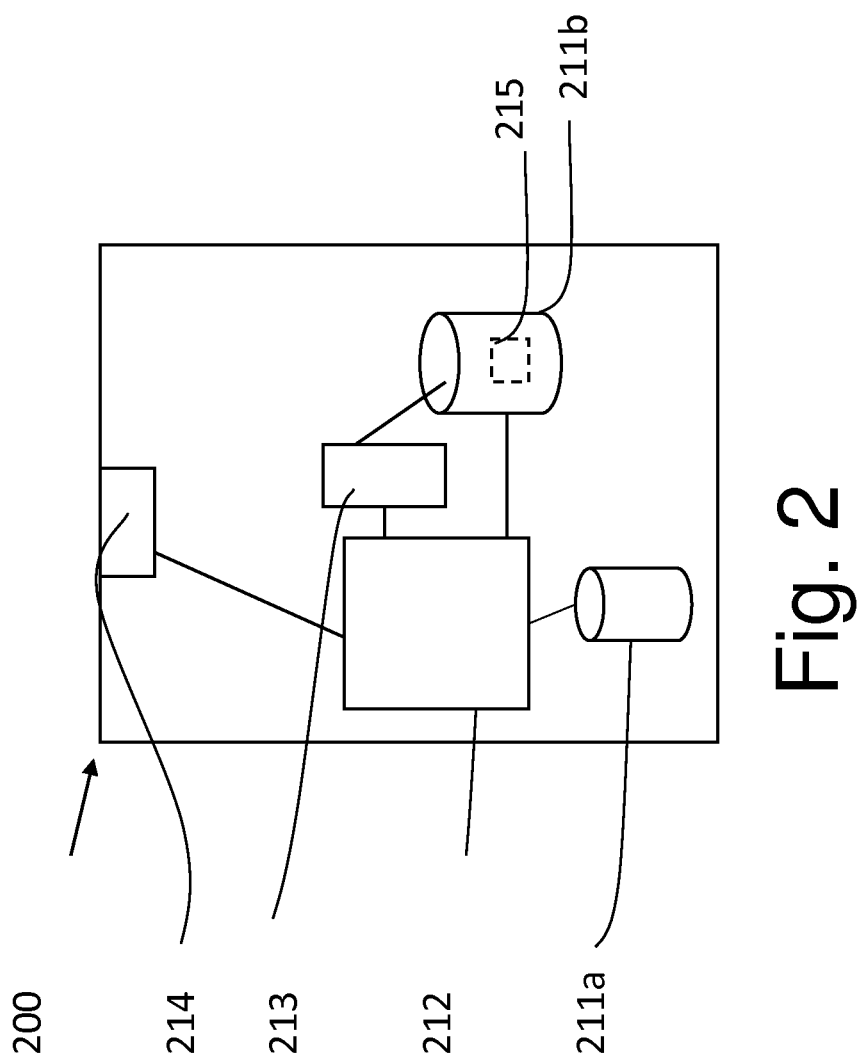
FIG. 2 shows a schematic representation of a control apparatus in a non-terrestrial network.

FIG. 2 illustrates an example of a control apparatus 200 for controlling a GW or a gNB as illustrated on FIGS. 1a to 1c. The control apparatus may comprise at least one random access memory (RAM) 211a, at least on read only memory (ROM) 211b, at least one processor 212, 213 and an input/output interface 214. The at least one processor 212, 213 may be coupled to the RAM 211a and the ROM 211b. The at least one processor 212, 213 may be configured to execute an appropriate software code 215. The software code 215 may for example allow to perform one or more steps to perform one or more of the present aspects. The software code 215 may be stored in the ROM 211b. The control apparatus 200 may be interconnected with another control apparatus 200 controlling another GW or gNB. In some embodiments, each GW or gNB comprises a control apparatus 200. In alternative embodiments, two or more GW or gNBs may share a control apparatus.

Figure 3:
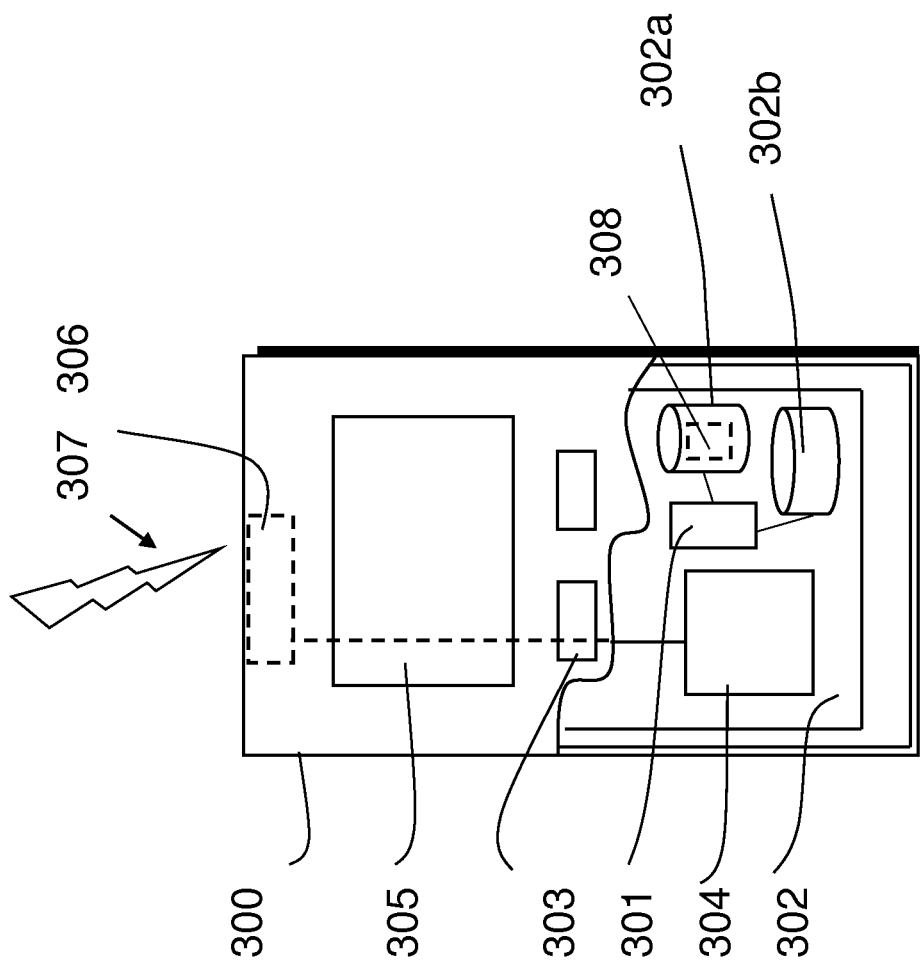
FIG. 3 shows a schematic representation of a terminal in a non-terrestrial network.

FIG. 3 illustrates an example of a terminal or UE 300, such as the UE illustrated on FIG. 1a to 1c. The UE 300 may be provided by any device capable of sending and receiving radio signals. Non-limiting examples comprise a mobile station (MS) or mobile device such as a mobile phone or what is known as a 'smart phone', a computer provided with a wireless interface card or other wireless interface facility (e.g., USB dongle), a personal data assistant (PDA) or a tablet provided with wireless communication capabilities, a machine-type communications (MTC) device, an Internet of things (IoT) type communication device or any combinations of these or the like. The UE 300 may provide, for example, communication of data for carrying communications. The communications may be one or more of voice, electronic mail (email), text message, multimedia, data, machine data and so on.

The terminal 300 may receive signals over an air or radio interface 307 via appropriate apparatus for receiving and may transmit signals via appropriate apparatus for transmitting radio signals. In FIG. 3 transceiver apparatus is designated schematically by block 306. The transceiver apparatus 306 may be provided for example by means of a radio part and associated antenna arrangement. The antenna arrangement may be arranged internally or externally to the mobile device.

The terminal 300 may be provided with at least one processor 301, at least one memory ROM 302a, at least one RAM 302b and other possible components 303 for use in software and hardware aided execution of tasks it is designed to perform, including control of access to and communications with access systems and other communication devices. The at least one processor 301 is coupled to the RAM 211a and the ROM 211b. The at least one processor 301 may be configured to execute an appropriate software code 308. The software code 308 may for example allow to perform one or more of the present aspects. The software code 308 may be stored in the ROM 211b.

The processor, storage and other relevant control apparatus can be provided on an appropriate circuit board and/or in chipsets. This feature is denoted by reference 304. The device may optionally have a user interface such as key pad 305, touch sensitive screen or pad, combinations thereof or the like. Optionally one or more of a display, a speaker and a microphone may be provided depending on the type of the device.

3GPP NTN (5G NR) study item (SI) TR 38.821 contains different scenarios. Some of these scenarios are based on satellites (LEO, MEO or GEO).

In a transparent (bent-pipe) satellite scenario the payload (5G NR) signal processing on-board the satellite is assumed to be "amplify and forward/frequency switching".

That is, the processing on-board the satellite may comprise reception amplification, frequency conversion or switching and transmission amplification. This may be applied for both the downlink (DL) direction (GW/gNB to UE via satellite) and uplink (UL) direction (UE to GW/gNB via satellite).

The satellite may provide means to relay the 5G NR signals, generated by a gNB and sent to the satellite using a feeder link (GW to satellite), to a UE via an access link (satellite to UE). Likewise, the satellite may provide means to relay the 5G NR signals, generated by a UE and sent to the satellite using an access link (UE to satellite), to a gNB via a feeder link (satellite to GW).

The satellite may provide means to exchange satellite gain control information with the gNB, via a feeder link (satellite to GW).

The feeder link and access link may operate in the same or different frequency bands, depending on the satellite/GW implementation solution and available frequency bands in different regions.

The access link may have to comply with 3GPP specifications and may be detectable by UEs using a conventional NR-Uu interface (i.e. 5G NR UEs may be able to connect to a satellite (in terms of physical radio signals) the same way as they would connect to a terrestrial network).

The feeder link may be transmitted on an international telecommunication union (ITU) satellite specific, but not 3GPP specified, carrier frequency. The NR-Uu interface may be specified for the feeder link.

A satellite network operator may have to be able to control each individual satellite via its own (potentially proprietary) so called "Telemetry, Tracking and Command" (TT&C) communication channel. The TT&C communication channel may be operated in any of the VHF/S/C/X/Ku/Ka bands, and typically may use wide(r)-beam antenna on the satellites. A GW-to-satellite TT&C may be used for telecommand, ranging and spacecraft tracking. A satellite-to-GW TT&C may be used for telemetry, ranging and earth station tracking. For example, "the UL carrier with the telecommand (TC) signal from the ground station is received by one of the low gain antennas and applied to both receiver inputs via the diplexer. The signal consists of a 2 GHz carrier, phase-modulated by an 8 kHz or 16 kHz subcarrier, itself BPSK-modulated by the TC data at a rate of less than 10 kbit/s" [ESA]. TT&C typical command bit error rate (BER) may be $10^{-6}$ while Telemetry BER may be $10^{-5}$ [Rec. ITU-R S.1716]. An "operational availability" of the command link may be 99.97650% to 99.99856% [Rec. ITU-R S.1716]. The control of the satellite may happen also via a control channel not labelled TT&C. The control channel allows among other things to relay satellite gain settings to and from the GW.

A fast movement of a satellite (a LEO satellite may move with orbital velocities of approx. 7.5 km/second) may require that the satellite TT&C link is maintained to at least two different GWs and/or that there may be a TT&C hand-over procedure implemented.

Figure 4B:
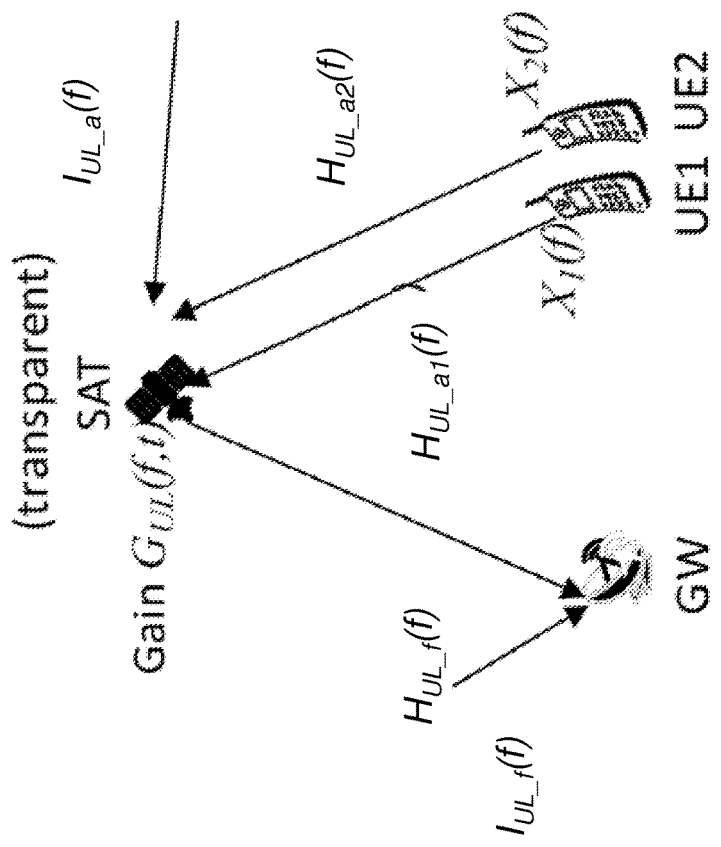
FIG. 4b shows a schematic representation of radio channel parameters in a non-terrestrial network comprising a transparent satellite in an uplink communications scenario.
Figure 4A:
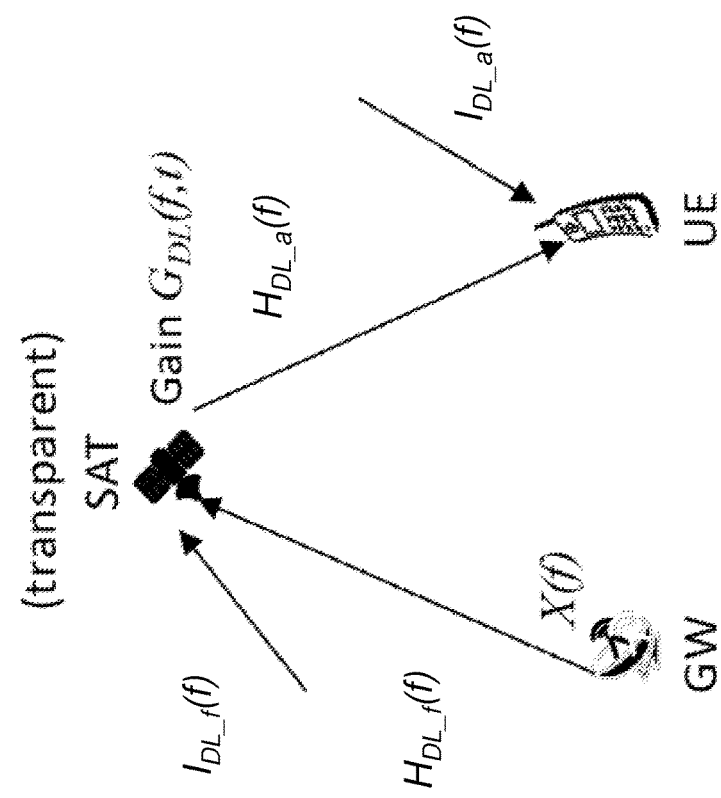
FIG. 4a shows a schematic representation of radio channel parameters in a non-terrestrial network comprising a transparent satellite in a downlink communications scenario.

FIG. 4a shows a schematic representation of radio channel parameters $H_{DL\_f}(f)$, $I_{DL\_f}(f)$, $G_{UL}(f,t)$, $H_{DL\_a}(f)$ and $I_{DL\_a}(f)$ in a non-terrestrial network in a DL communications (i.e. gNB to UE via satellite) scenario.

$H_{DL\_f}(f)$ may refer to a transfer function on a feeder link for DL communications.

$I_{DL\_f}(f)$ may refer to interference on a feeder link for the DL communications scenario.

$G_{UL}(f,t)$ may refer to a satellite gain in for the communications scenario.

$H_{DL\_a}(f)$ may refer to a transfer function on an access link for the DL communications scenario.

$I_{DL\_a}(f)$ may refer to interference on an access link for the DL communications scenario.

The received signal at the satellite $Y_{SAT}(f)$ from gNB may be expressed as follows.

$$Y_{SAT}(f)=X(f)H_{DL\_f}(f)+I_{DL\_f}(f)$$

X(f) may refer to a transmitted signal from gNB.

The received signal at the UE $Y_{UE}(f)$ from the satellite may be expressed as follows.

$$Y_{UE}(f)=Y_{SAT}(f)G_{DL}(f,t)H_{DL\_a}(f)+I_{DL\_a}(f)$$

$$=X(f)H_{DL\_f}(f)G_{DL}(f,t)H_{DL\_a}(f)+I_{DL\_f}(f)G_{DL}(f,t)H_{DL\_a}(f)+I_{DL\_a}(f)$$

$$=X(f)H_{DL\_tot}(f)+I_{DL\_tot}(f)$$

The satellite gain $G_{DL}(f,t)$ for the DL communications scenario, comprising access and feeder link gain component, may be expressed as follows.

$$G_{DL,sat}(f,t)=G_{f,rx}(f,t)G_{a,tx}(f,t)$$

$G_{a,tx}(f,t)$ may refer to a satellite gain for transmission on access link for the DL communications scenario.

$G_{f,rx}(f,t)$ may refer to a satellite gain for reception on feeder link for the DL communications scenario.

$H_{DL\_tot}(f)$ may refer to a composite channel transfer function for the DL communications scenario.

$I_{DL\_tot}(f)$ may refer to a total interference for the DL communications scenario.

The composite channel transfer function $H_{DL\_tot}(f)$ for the DL communications scenario may be expressed as follows.

$$H_{DL\_tot}(f)=H_{DL\_f}(f)G_{f,rx}(f,t)G_{a,tx}(f,t)H_{DL\_a}(f)$$

$$=H_{DL\_f}(f)G_{DL,sat}(f,t)H_{DL\_a}(f)$$

The total interference $I_{DL\_tot}(f)$ for the DL communications scenario may be expressed as follows.

$$I_{DL\_tot}(f)=I_{DL\_f}(f)G_{DL,sat}(f,t)H_{DL\_a}(f)+I_{DL\_a}(f)$$

For the DL communications scenario the strategies of the satellite to adjust a satellite gain $G_{DL,sat}(f, t)$ or $G_{DL,sat}(t)$ may be to apply constant or quasi-constant gain or may be seeking to invert the channel response.

In a constant gain implementation, a satellite gain $G_{DL,sat}(f,t)$ may be a constant or it may be changing slowly. In particular, it may not depend on a transmitted UL or DL signal.

In a constant equivalent isotopically radiated power (EIRP) implementation, a satellite gain $G_{DL,sat}(t)$ may be determined so that the satellite transmits a constant average power $P_{SAT,0,DL}$:

$$G_{DL}(t) = \frac{P_{SAT,0,DL}}{P_{gNB}\sum_f |H_f(f)|^2}$$

Interference may be neglected for the sake of simplicity.

It may be noted that the transmitted power $P_{gNB}$ at the gNB may change with the load (e.g. with the number of transmitted physical resource blocks (PRBs)).

In a constant power spectral density (PSD) implementation, a satellite gain $G_{DL}(f, t)$ may be determined such that the power per subcarrier is equalized. The constant PSD may lead to amplifying subcarriers which have no signal. For instance, assume at time to in DL the gNB schedules a UE1 on one bandwidth part (BWP) BWP1 and at ti (e.g. one subframe later) another UE2 on another BWP2 is activated and scheduled. The BWP1 will continue to be amplified as before and BWP2 will be brought to the same level as BWP1. A negative effect in this approach may be the amplification of noise when no signal is present, leading to system interference.

In another implementation, a satellite gain $G_{DL,sat}(f, t)$ may be determined so that the satellite transmits a constant average power $P_{SAT,0,DL}$ per frequency. The satellite may equalize the feeder link by means of feeder link pilots. In that case the satellite is able to adjust the gain considering the channel only:

$$G_{DL}(f, t) = \frac{P_{SAT,0,DL}}{|H_f(f)|^2}$$

The feeder link pilots may be part of a logical side channel which is not visible in the access link. Thus the feeder link pilots could be separate from the GW payload or gNB signal, and not be part of the protocol stack shown in FIGS. 1b and 1c. The feeder link pilots may be transmitted on an additional physical channel (e.g. on a carrier or subcarrier adjacent to the feeder link). The feeder link pilots may also be interleaved in time or frequency in the feeder link, transparent to the GW payload or gNB signal.

The feeder link pilots may also be a downlink reference signal (DRS) that the gNB is transmitting in DL. This implementation may require that the satellite has been configured by the gNB to recognize the DRS transmissions.

FIG. 4b shows a schematic representation of radio channel parameters $H_{UL\_f}(f)$, $I_{UL\_f}(f)$, $G_{DL}(f,t)$, $H_{UL\_a}(f)$ and $I_{UL\_a}(f)$ in a non-terrestrial network in an UL communications (i.e. UE to/gNB via satellite) scenario.

$H_{UL\_f}(f)$ may refer to a transfer function on a feeder link for the UL communications scenario.

$I_{UL\_f}(f)$ may refer to interference on a feeder link for the UL communications scenario.

$G_{UL}(f,t)$ may refer to a satellite gain for the UL communications scenario.

$H_{UL\_a}(f)$ may refer to a transfer function on an access link for the UL communications scenario.

$I_{UL\_a}(f)$ may refer to interference on an access link for the UL communications scenario.

It will be understood that the transfer function $H_{UL\_f}(f)$ on the feeder link for the UL communications scenario and the transfer function $H_{DL\_f}(f)$ on the feeder link for the DL communications scenario may be different. Likewise, the transfer function $H_{UL\_a}(f)$ on the access link for the UL communications scenario and the transfer function $H_{DL\_a}(f)$ on the access link for the DL communications scenario may be different. The interference $I_{UL\_f}(f)$ on the feeder link for the UL communications scenario and the interference $I_{DL\_f}(f)$ on the feeder link for the DL communications scenario may be different. The interference $I_{UL\_a}(f)$ on the access link for the UL communications scenario and the interference $I_{DL\_a}(f)$ on the access link for the DL communications scenario may be different.

The received signal $Y_{SAT}(f)$ at the satellite from a single UE for the UL communications scenario may be expressed as follows.

$$Y_{SAT}(f)=X(f)H_{UL\_a}(f)+I_{UL\_a}(f)$$

X(f) may refer to a transmitted signal from the single UE.

The received signal at the gNB $Y_{gNB}(f)$ from the single UE for the UL communications scenario may be expressed as follows.

$$Y_{gNB}(f)=Y_{SAT}(f)G_{UL,sat}(f,t)H_{UL\_f}(f)+I_{UL\_f}$$

$$=X(f)H_{UL\_a}(f)G_{UL,sat}(f,t)H_{UL\_f}(f)+I_{UL\_a}(f)G_{UL,sat}(f,t)H_{UL\_f}(f)+I_{UL\_f}(f)$$

$$=X(f)H_{UL\_tot}(f)+I_{UL\_tot}(f)$$

The satellite gain in $G_{UL,sat}(f, t)$ for the UL communications scenario comprises an access and a feeder link gain component and may be expressed as follows.

$$G_{UL,sat}(f,t)=G_{a,rx}(f,t)G_{f,tx}(f,t)$$

$G_{a,rx}(f,t)$ may refer to a satellite gain for reception on access link for the UL communications scenario.

$G_{f,tx}(f,t)$ may refer to a satellite gain for transmission on feeder link for the UL communications scenario.

$H_{UL\_tot}(f)$ may refer to a composite channel transfer function for the UL communications scenario.

$I_{UL\_tot}(f)$ may refer to a total interference for the UL communications scenario.

The composite channel transfer function $H_{UL\_tot}(f)$ for the UL communications scenario may be expressed as follows.

$$H_{UL\_tot}(f)=H_{UL\_a}(f)G_{a,rx}(f,t)G_{f,tx}(f,t)H_{UL\_f}(f)$$

$$=H_{UL\_a}(f)G_{UL,sat}(f,t)H_{UL\_f}(f)$$

The total interference $I_{UL\_tot}(f)$ for the UL communications scenario may be expressed as follows.

$$I_{UL\_tot}(f)=I_{UL\_a}(f)G_{UL,sat}(f,t)H_f(f)+I_{UL\_f}(f).$$

For the UL communications scenario the strategies of the satellite to adjust a satellite gain $G_{UL,SAT}(f, t)$ or $G_{UL,SAT}(t)$ may be to apply constant or quasi-constant gain or may be seeking to invert the channel response.

In a constant gain implementation, a satellite gain $G_{UL,sat}(f, t)$ may be a constant or it may be changing slowly. In particular, it may not depend on the transmitted UL or DL signal.

In a constant equivalent isotopically radiated power (EIRP) scheme, a satellite gain $G_{UL}(t)$ may be determined such that the satellite always emits a predefined average transmit power $P_{SAT,0,UL}$. In this case the satellite gain $G_{UL}(t)$ may not depend on the frequency, but may depend on the frequency responses of the access links and their power:

$$G_{UL}(t) = \frac{P_{SAT,0,UL}}{\sum_f |Y_{SAT}(f)|^2}$$

It may be noticed that the satellite gain $G_{UL}(t)$ depends on the predefined average transmit power $P_{SAT,0,UL}$.

For instance, assume at time to, ten close UEs are scheduled. The satellite gain $G_{UL}(t)$ may be smaller. If at time ti (e.g. one subframe later) two far UEs are scheduled, then the satellite gain $G_{UL}(t)$ may be larger.

Even the number of physical resource blocks (PRBs) may have an impact: if at to two UEs with two PRBs are scheduled (e.g. low bit rate UEs), then the satellite gain $G_{UL}(t)$ may be larger, and if at ti the same two UEs or similar two UEs (at similar distance) are scheduled with twenty PRBs, the satellite gain $G_{UL}(t)$ may be smaller (e.g. reduced by 10 dB).

In a constant power spectral density (PSD) implementation, a satellite gain $G_{UL}(f, t)$ may be determined such that the power per subcarrier is equalized. This implementation may lead to amplification of noise when some subcarriers do not carry a signal.

$$G_{UL}(f, t) = \frac{P_{SAT,0,UL}}{|Y_{SAT}(f)|^2}$$

In a constant received power at GW/gNB implementation, a satellite gain $G_{UL}(f, t)$ may be determined such that a received power $P_{gNB,Rx,UL}$ at gNB is constant. There may be power control on the feeder link, but this may look similar to the case above, assuming that the feeder link does not change too fast.

$$G_{UL}(f, t) = \frac{P_{gNB,Rx,UL}}{|H_f(f)|^2 |Y_{SAT}(f)|^2}$$

In light of the above, it will be understood that the satellite gain settings for the UL communications scenario (e.g. $G_{UL}(f, t)$ or $G_{UL}(t)$) may differ from the satellite gain settings for the DL communications scenario (e.g. $G_{UL}(f, t)$ or $G_{UL}(t)$).

A problem in conventional systems is that a UE may assume reciprocity between satellite gain settings for the UL communications scenario and the satellite gain settings for the DL communications scenario and therefore may assume reciprocity between an UL pathloss and a DL pathloss. As a result, UE UL transmission power settings may be determined based on the DL pathloss as opposed to the UL pathloss.

This can be read for example from the power control equation in 3GPP TS 38.213 (section 7.1.1) for a physical uplink shared channel (PUSCH) reproduced below.

$$P_{PUSCH,b,f,c}(i, j, q_d, l) = \min\begin{cases} P_{CMAX,f,c}(i), \\ P_{O\_PUSCH,b,f,c}(j) + 10\log_{10}(2^\mu \cdot M_{RB,b,f,c}^{PUSCH}(i)) + \\ \alpha_{b,f,c}(j) \cdot PL_{b,f,c}(q_d) + \Delta_{TF,b,f,c}(i) + f_{b,f,c}(i, l) \end{cases} [dBm]$$

This can also be read for example from the power control equation in 3GPP TS 38.213 (section 7.2.1) for a physical uplink control channel (PUCCH) reproduced below.

$$P_{PUCCH,b,f,c}(i, q_u, q_d, l) = \min\begin{cases} P_{CMAX,f,c}(i), \\ P_{O\_PUCCH,b,f,c}(q_u) + 10\log_{10}(2^\mu \cdot M_{RB,b,f,c}^{PUCCH}(i)) + \\ PL_{b,f,c}(q_d) + \Delta_{F\_PUCCH}(F) + \Delta_{TF,b,f,c}(i) + g_{b,f,c}(i, l) \end{cases} [dBm]$$

This can also be read for example from the power control equation in 3GPP TS 38.213 (section 7.3.1) for a sounding reference signal (SRS) reproduced below.

$$P_{SRS,b,f,c}(i, q_s, l) = \min\begin{cases} P_{CMAX,f,c}(i), \\ P_{O\_SRS,b,f,c}(q_s) + 10\log_{10}(2^\mu \cdot M_{SRS,b,f,c}(i)) + \\ \alpha_{SRS,b,f,c}(q_s) \cdot PL_{b,f,c}(q_d) + h_{b,f,c}(i, l) \end{cases}$$

This can also be read for example from the power control equation in 3GPP TS 38.213 (section 7.4.1) for a physical random access channel (PRACH) reproduced below.

$$P_{PRACH,b,f,c}(i) = \min\{P_{CMAX,f,c}(i), P_{PRACH,target,f,c} + PL_{b,f,c}\}$$

In these equations, $PL_{b,f,c}$ is a pathloss for the active UL BWP b of carrier f based on the DL RS associated with the PRACH transmission on an active DL BWP of serving cell c.

$PL_{b,f,c}(q_d)$ may be defined as a referenceSignalPower higher layer filtered reference signal received power (RSRP), for example based on the Secondary Synchronization Signal (SSS) in a synchronization signal block (SSB). The referenceSignalPower may be defined as SS-PBCH-BlockPower (average energy per resource element (EPRE) of the resource elements that carry secondary synchronization signals in dBM that the NW used for SSB transmission). It may be signalled in an information element (defined in TS 38.331) ServingCellConfigCommonSIB.

In conventional systems, the UE may calculate UE UL transmission power settings $P_{PUSCH}$, $P_{PUCH}$, $P_{SRS}$ and $P_{PRACH}$ for PUSCH, PUCCH, SRS and PRACH by measuring a DL pathloss based, for example, on reference signal received power (RSRP). Such calculation may be ineffective.

The reciprocity assumption is erroneous because the UL pathloss may depend on the UL satellite gain settings (e.g. $G_{UL}(f, t)$ or $G_{UL}(t)$) whereas the DL pathloss may depend on DL satellite gain settings (e.g. $G_{UL}(f, t)$ or $G_{UL}(t)$) and as discussed above the UL satellite gain settings may differ from the DL satellite gain settings.

Furthermore, the UL satellite gain settings and DL satellite gain settings may change independently, further rendering the existing UE UL power setting mechanisms ineffective.

One or more aspects of this disclosure address this problem.

One or more aspects of this disclosure relate to techniques employed by the satellite, the GW and/or the gNB to determine UL satellite gain settings, DL satellite gain settings and/or a difference between UL satellite gain settings and DL satellite gain settings.

One or more aspects of this disclosure relate to an autonomous gain control (AGO) technique wherein the satellite may determine the UL satellite gain settings and/or DL satellite gain settings in an autonomous fashion. The satellite may perform UL measurements and/or DL measurements. The satellite may determine UL satellite gain settings based on the UL measurements and/or DL satellite gain settings based on the DL measurements. The satellite may inform the gNB about the UL satellite gain settings, DL satellite gain settings and/or a difference between UL satellite gain settings and DL satellite gain settings, for example via a side channel, such as the earlier mentioned TT&C control channel (via the GW). The gNB may determine UE UL transmission power settings based on the UL satellite gain settings, DL satellite gain settings and/or a difference between UL satellite gain settings and DL satellite gain settings. The determination of UL satellite gain settings, DL satellite gain settings and/or a difference between UL satellite gain settings and DL satellite gain settings may take place more or less frequently. The determination of UL satellite gain settings, DL satellite gain settings and/or a difference between UL satellite gain settings and DL satellite gain settings may take place in a step-wise fashion. The gNB may provide the UE UL transmission power settings to one or more UEs.

One or more aspects of this disclosure relate to an alternative technique wherein the satellite may perform UL measurements and/or DL measurements and may inform the gNB of the UL measurements and/or DL measurements (via the GW). The gNB may determine the UL satellite gain settings, DL satellite gain settings and/or a difference between UL satellite gain settings and DL satellite gain settings based on the UL measurements and/or the DL measurements. The gNB may instruct the satellite (via the GW) to take the UL satellite gain settings and DL satellite gain settings into use The gNB may determine UE UL transmission power settings based the satellite gain settings for UL communications, DL satellite gain settings and/or a difference between UL satellite gain settings and DL satellite gain settings. The gNB may provide the UE UL transmission power settings to one or more UEs.

One or more aspects of this disclosure relate to configuring the gNB to periodically or aperiodically communicate with the satellite (via the GW) to indicate when specific operations (e.g. performing UL measurements and/or DL measurements, determining UL satellite gain settings, DL satellite gain settings and/or a difference between UL satellite gain settings and DL satellite gain settings, use UL satellite gain settings and/or DL satellite gain settings determined by the GW) need to be performed. The communication may be performed via control communication/signalling between the gNB and the GW. The control communication/signaling may take place via one or more sidelink (e.g. out-band or in-band) channels.

In one variant the GW may inform the gNB about both absolute UL satellite gain settings and DL satellite gain settings.

In one variant the GW may inform the gNB about absolute UL satellite gain settings, DL satellite gain settings, a difference between the UL satellite gain settings and DL satellite gain settings and an offset.

In one variant the GW may inform the gNB about a difference between the UL satellite gain settings and DL satellite gain settings.

In one variant the GW may inform the gNB about a difference (i.e. delta) to a previous UL satellite gain settings, DL satellite gain settings and/or a difference between the UL satellite gain settings and DL satellite gain settings. In one variant the satellite may do so if a threshold has been reached.

The informing of an absolute UL satellite gain settings and/or DL satellite gain settings may be of relevance even when the difference between UL satellite gain settings and DL satellite gain settings has not changed, when the UL satellite gain settings and/or DL satellite gain settings by the satellite do not correspond to actual pathloss changes, for instance because power limitations have been reached. In that case it may be helpful for the gNB to adjust UE UL power settings as well.

One or more aspects of this disclosure relate to configuring the gNB to determine UE UL transmission power settings based on UL satellite gain settings, DL satellite gain settings and/or a difference between the UL satellite gain settings. The gNB may provide the UE UL transmission power settings via broadcast signalling to a plurality of (e.g. all) UEs or via dedicating signalling (e.g. RRC signalling) to a UE.

The gNB may provide the UE UL transmission power settings via transmit power control (TPC) commands.

One or more aspects of this disclosure relate to configuring the gNB to provide TPC commands for one or more (e.g. all) UL channels (e.g. PUCCH, PUCCH, PRACH) and/or one or more of (e.g. all) reference signals (e.g. SRS) to compensate for the effective UL pathloss changes.

In a first variant, the GW/gNB may provide one or more $P_0$ parameters (e.g. $P_{0\_PUSCH}$, $P_{0\_PUCCH}$, $P_{0\_SRS}$ or $P_{0\_PRACH}$) via broadcast signalling. The one or more $P_0$ parameters may be included in a broadcast system information (SI) message. For example, UEs may be paged and then may start listening to the broadcast SI message. Alternatively, the one or more $P_0$ parameters (e.g. $P_{0\_PUSCH}$, $P_{0\_PUCCH}$, $P_{0\_SRS}$ or $P_{0\_PRACH}$) may be encoded in a broadcast signal such as the group common (GC)-PDCCH.

In a second variant, the gNB may provide one or more $P_0$ parameters (e.g. $P_{0\_PUSCH}$, $P_{0\_PUCCH}$, $P_{0\_SRS}$ or $P_{0\_PRACH}$) via dedicated signalling.

In a third variant, the gNB may use dedicated signalling to provide UE UL transmission power settings for a specific UE and for a specific UL channels (e.g. PUSCH or PUCCH) and/or a specific reference signal (e.g. SRS). For instance, the GW/gNB may send a TPC command in downlink control information (DCI) format_0_0 or format_0_1 or format_2_2 (see 38.213 section 7) to adjust the PUSCH and PUCCH power. The GW/gNB may send a TPC command in DCI format_2_2 or format_2_3 to adjust the SRS power. As also the PRACH may be affected a new DCI format may be introduced to adjust the PRACH.

Alternatively or additionally, a new TPC command $s_{b,f,c}(i,l)$ may be introduced that may be applied for one or more (e.g. all) UEs and for one or more of (e.g. all) UL channels (e.g. PUSCH, PUCCH, PRACH) and/or one or more of (e.g. all) reference signals (e.g. SRS). The new TPC command may amount to a DCI carrying a TPC command for some or all UEs on GC-PDCCH. The new parameter $s_{b,f,c}(i,l)$ may be used in the power control equations in 3GPP TS 38.213 (sections 7.1.1, 7.2.1, 7.3.1 and 7.4.1).

$$P_{PUSCH,b,f,c}(i, j, q_d, l) = \min\begin{Bmatrix} P_{CMAX,f,c}(i) \\ P_{0\_PUSCH,b,f,c}(j) + 10\log_{10}(2^\mu \cdot M_{RB,b,f,c}^{PUSCH}(i)) + \alpha_{b,f,c}(j) \cdot (PL_{b,f,c}(q_d)) + \\ \Delta_{TF,b,f,c}(i) + f_{b,f,c}(i,l) + s_{b,f,c}(i,l) \end{Bmatrix}[dBm]$$

$$P_{PUCCH,b,f,c}(i, q_u, q_d, l) = \min\begin{Bmatrix} P_{CMAX,f,c}(i), \\ P_{0\_PUCCH,b,f,c}(q_u) + 10\log_{10}(2^\mu \cdot M_{RB,b,f,c}^{PUCCH}(i)) + PL_{b,f,c}(q_d) + \Delta_{F\_PUCCH}(F) + \\ \Delta_{TF,b,f,c}(i) + g_{b,f,c}(i,l) + s_{b,f,c}(i,l) \end{Bmatrix}[dBm]$$

$$P_{SRS,b,f,c}(i, q_s, l) = \min\begin{Bmatrix} P_{CMAX,f,c}(i), \\ P_{0\_SRS,b,f,c}(q_s) + 10\log_{10}(2^\mu \cdot M_{SRS,b,f,c}(i)) + \\ \alpha_{SRS,b,f,c}(q_s) \cdot PL_{b,f,c}(q_d) + h_{b,f,c}(i,l) + s_{b,f,c}(i,l) \end{Bmatrix}[dBm]$$

$$P_{PRACH,b,f,c}(i) = \min\{P_{CMAX,f,c}(i), P_{PRACH,target,f,c} + PL_{b,f,c} + s_{b,f,c}(i,l)\}[dBm]$$

In a fourth variant, the gNB may provide a Gain_correction parameter to one or more (e.g. all) UEs as shown in the power control equations below. The Gain_correction parameter may compensate for the difference in UL satellite gain settings and DL satellite gain settings. As already discussed the UL satellite gain settings may affect the UL pathloss. Thus, UL satellite gain settings changes may lead to UL pathloss changes. This variant addresses directly the underlying mechanism of UL satellite gain settings changes, considering that the Uu interface consists of access link, feeder link and the transparent satellite.

Furthermore, the DL satellite gain settings may affect what the UE is measuring as DL pathloss. The DL pathloss is part of UE UL power setting formula in terms of PL. Therefore the Gain_correction also addresses the satellite DL gain changes. The Gain_correction thus will be compensating for the difference in UL satellite gain settings and DL satellite gain settings that the satellite is introducing.

$$P_{PUSCH,b,f,c}(i, j, q_d, l) = \min\begin{Bmatrix} P_{CMAX,f,c}(i), \\ P_{0\_PUSCH,b,f,c}(j) + 10\log_{10}(2^\mu \cdot M_{RB,b,f,c}^{PUSCH}(i)) + \alpha_{b,f,c}(j) \cdot (PL_{b,f,c}(q_d) + \\ \text{Gain\_correction}) + \Delta_{TF,b,f,c}(i) + f_{b,f,c}(i,l) \end{Bmatrix}[dBm]$$

$$P_{PUCCH,b,f,c}(i, q_u, q_d, l) = \min\begin{Bmatrix} P_{CMAX,f,c}(i), \\ P_{0\_PUCCH,b,f,c}(q_u) + 10\log_{10}(2^\mu \cdot M_{RB,b,f,c}^{PUCCH}(i)) + PL_{b,f,c}(q_d) + \text{Gain\_correction} + \\ \Delta_{F\_PUCCH}(F) + \Delta_{TF,b,f,c}(i) + g_{b,f,c}(i,l) \end{Bmatrix}[dBm]$$

-continued $$P_{SRS,b,f,c}(i, q_s, l) =$$

$$\min \left\{ \begin{array}{l} P_{CMAX,f,c}(i), \\ P_{0\_SRS,b,f,c}(q_s) + 10\log_{10}(2^\mu \cdot M_{SRS,b,f,c}(i)) + \\ \alpha_{SRS,b,f,c}(q_s) \cdot (PL_{b,f,c}(q_d) + \text{Gain\_correction})) + h_{b,f,c}(i, l) \end{array} \right\} [\text{dB}m]$$

$$P_{PRACH,b,f,c}(i) =$$

$$\min\{P_{CMAX,f,c}(i), P_{PRACH,target,f,c} + PL_{b,f,c} + \text{Gain\_correction})\}[\text{dB}m],$$

The Gain_correction parameter may be scaled with the slope parameter α and therefore updating the Gain_correction parameter may be different from updating the $P_0$ parameters or the closed loop TPC commands. The Gain_correction may be sent via dedicated RRC signaling (e.g. along with $P_0$ parameters and α) or via PDCCH (e.g. along with the closed loop TPC commands).

It may be noted that current TPC commands are sent in dedicated signalling. For the purpose of the proposed method the TPC commands may be broadcast and may be read by a plurality of connected UEs (third and fourth variants).

It may also be noted that broadcasting updates of a $P_0$ parameter on GC-PDCCH or sending a TPC command for $s_{b,f,c}(i, l)$ or for Gain_correction on GC-PDCCH may amount to the same.

It may also be noted that a $P_0$ parameter may signalled as an increment similar to TPC commands, for example when not all UEs are configured with the same $P_0$ parameter.

FIG. 5 shows a schematic representation of a signalling diagram of a method of managing at least one UL transmission power settings for at least one UE in a non-terrestrial network.

In step 1, the satellite, the GW and/or the gNB may cooperate to determine UL satellite gain settings, DL satellite gain settings and/or a difference between UL satellite gain settings and DL satellite gain settings.

In step 2, the gNB may be aware of the UL satellite gain settings, DL satellite gain settings and/or a difference between UL satellite gain settings and DL satellite gain settings. If the UL satellite gain settings, DL satellite gain settings and/or a difference between UL satellite gain settings and DL satellite gain settings have changed sufficiently it may decide to determine UE UL transmission power settings for UE1 and UE2. For example, if a difference satellite gain settings between UL satellite gain settings and DL satellite gain settings change is above a threshold, the UE UL transmission power settings may be determined. Otherwise, the UE UL transmission power settings may not be updated (at least not because of the satellite).

In step 3, the gNB may provide the UL transmission power settings for UE1 and UE2.

Figure 6:
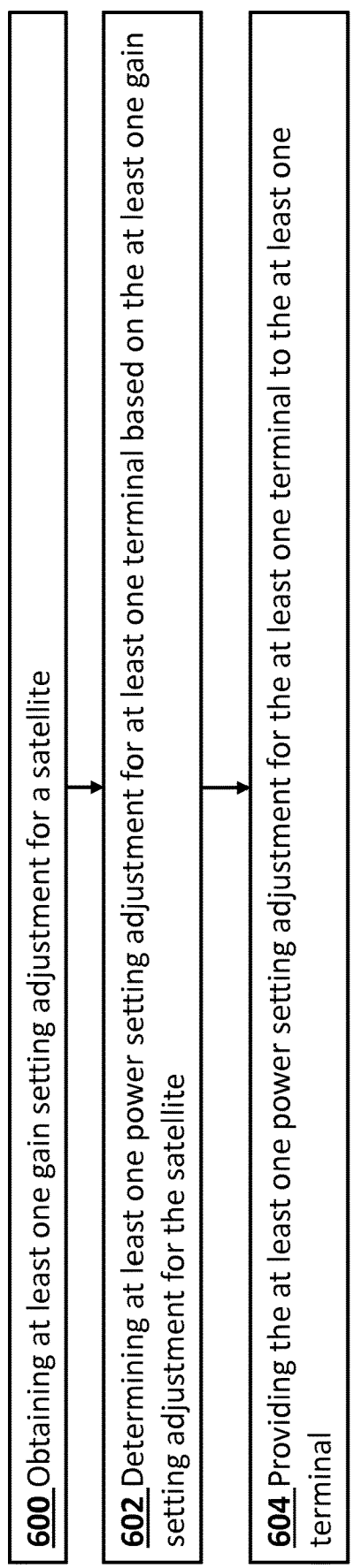
FIG. 6 shows a schematic representation of a block diagram of a method of managing at least one power setting for at least one terminal in a non-terrestrial network performed by a gateway and/or a gNB.

FIG. 6 shows a schematic representation of a block diagram of a method of managing at least UL power setting for at least one terminal in a NTN. The method may be performed by a gNB.

In step 602, the gNB may obtain at least one gain setting adjustment for a satellite. The at least one gain setting for the satellite may comprise at least one UL gain setting (e.g. $G_{UL}(f, t)$ or $G_{UL}(t)$), DL gain setting (e.g. $G_{UL}(f, t)$ or $G_{UL}(t)$) and/or difference between UL gain setting and DL gain setting for the satellite (e.g. $G_{UL}(f, t)-G_{DL}(f, t)$ or $G_{UL}(t)-G_{UL}(t)$). The at least one UL gain setting for the satellite (e.g. $G_{UL}(f, t)$ or $G_{UL}(t)$) may comprise at least one of an UL reception gain setting (e.g. $G_{a,rx}(f,t)$ or an UL transmission gain setting (e.g. $G_{f,tx}(f, t)$). The at least one gain DL setting for the satellite (e.g. $G_{UL}(f, t)$ or $G_{UL}(t)$) may comprise at least one of a DL reception gain setting (e.g. $G_{f,rx}(f, t)$ or a DL transmission gain setting (e.g. $G_{a,tx}(f, t)$).

In an implementation, the gNB may receive UL measurements and/or DL measurements collected at the satellite. The GW/gNB may determine the at least one gain setting adjustment for the satellite based on the measurements. The GW/gNB may provide to the satellite the at least one gain setting adjustment for the satellite.

In another implementation, the satellite may determine the least one gain setting adjustment for the satellite. The gNB may receive the at least one gain setting adjustment for the satellite from the satellite.

In step 604, the gNB may determine at least one power setting adjustment for at least one terminal based on the at least one gain setting adjustment for the satellite obtained in step 602. The at least one power setting adjustment for the at least one terminal may comprise at least one UL transmission power setting adjustment.

The at least one power setting adjustment for the at least one terminal may be specific for a terminal or generic for a plurality of (e.g. all) terminals.

The at least one power setting adjustment for the at least one terminal may be specific for a channel (e.g. PUSCH, PUCCH or PRACH) or a reference signal (e.g. SRS). The at least one power setting adjustment for the at least one terminal specific for a channel (e.g. PUSCH, PUCCH or PRACH) or a reference signal (e.g. SRS) may comprise a $P_0$ (e.g. $P_{0\_PUSCH}$, $P_{0\_PUCCH}$, $P_{0\_PRACH}$ or a $P_{0\_SRS}$) parameter adjustment.

The at least one power setting adjustment for the at least one terminal may be generic for one or more channels (e.g. PUSCH, PUCCH or PRACH) and one or more reference signals (e.g. SRS). The at least one power setting adjustment may comprise a power offset (e.g. $s_{b,f,c}(i, l)$ adjustment or a pathloss offset (e.g. Gain_correction) adjustment.

In step 606, the gNB may provide the at least one power setting adjustment for the at least one terminal determined in step 604 to the at least one terminal. The at least one power setting adjustment for the at least one terminal may be provided via at least one broadcast signal or at least one dedicated signal.

Figure 7:
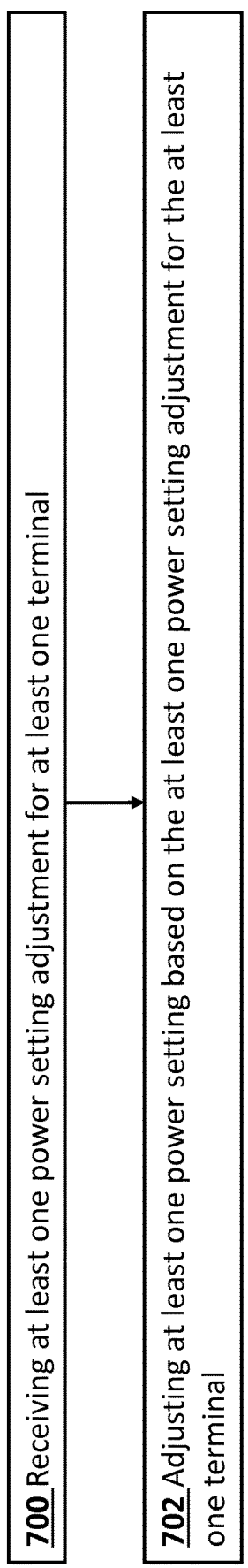
FIG. 7 shows a schematic representation of a block diagram of a method of managing at least one power setting for at least one terminal in a non-terrestrial network performed by a terminal.

FIG. 7 shows a schematic representation of a block diagram of a method of managing at least one UL power setting for at least one terminal in a NTN. The method may be performed by the terminal.

In step 702, the terminal may receive at least one power setting adjustment for at least one terminal. The at least one power setting adjustment for the at least one terminal may be determined by a gNB based on at least one gain setting adjustment for a satellite.

The at least one power setting adjustment for the at least one terminal may be provided via at least one broadcast signal or at least one dedicated signal.

The at least one power setting adjustment for the at least one terminal may be specific for a terminal or generic for a plurality of (e.g. all) terminals.

The at least one power setting adjustment for the at least one terminal may be specific for a channel (e.g. PUSCH, PUCCH or PRACH) or a reference signal (e.g. SRS). The at least one power setting adjustment for the at least one terminal specific for a channel (e.g. PUSCH, PUCCH or PRACH) or a reference signal (e.g. SRS) may comprise a $P_0$ (e.g. $P_{0\_PUSCH}$, $P_{0\_PUCCH}$, $P_{0\_PRACH}$ or a $P_{0\_SRS}$) parameter adjustment.

The at least one power setting adjustment for the at least one terminal may be generic for one or more channels (e.g.

PUSCH, PUCCH or PRACH) and one or more reference signal (e.g. SRS). The at least one power setting adjustment may comprise a power offset (e.g. $s_{b,f,c}(i, 1)$) adjustment or a pathloss offset (e.g. Gain_correction) adjustment.

In step 704, the terminal may adjust at least one power setting based on the at least one power setting adjustment for the at least one terminal. The at least one power setting may be an UL transmission power setting. The at least one power setting may be specific for a channel (e.g. PUSCH, PUCCH or PRACH) or a reference signal (e.g. SRS). The at least one power setting may comprise a $P_{PUSCH}$, $P_{PUCCH}$, $P_{PRACH}$ or a $P_{SR}$.

Figure 8:
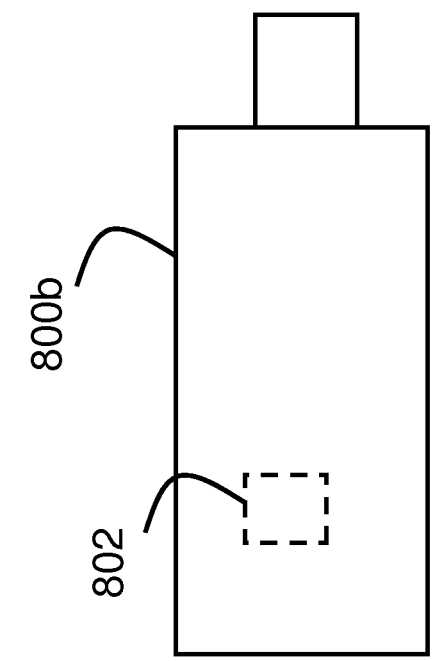
FIG. 8 shows a schematic representation of a non-volatile memory medium storing instructions which when executed by a processor allow a processor to perform one or more of the steps of the above methods.
Figure 8:
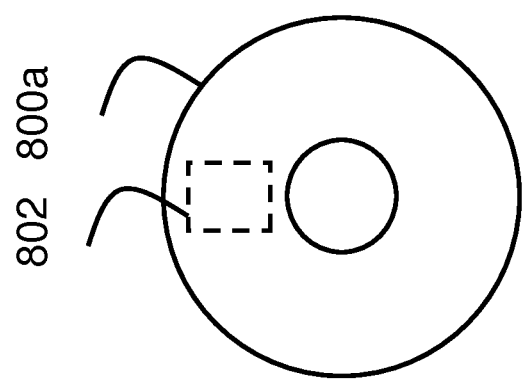

FIG. 8 shows a schematic representation of non-volatile memory media 800*a* (e.g. computer disc (CD) or digital versatile disc (DVD) and 800*b* (e.g. universal serial bus (USB) memory stick) storing instructions and/or parameters 802 which when executed by a processor allow the processor to perform one or more of the steps of the above methods.

It is noted that while the above describes example embodiments, there are several variations and modifications which may be made to the disclosed solution without departing from the scope of the present invention.

The embodiments may thus vary within the scope of the attached claims. In general, some embodiments may be implemented in hardware or special purpose circuits, software, logic or any combination thereof. For example, some aspects may be implemented in hardware, while other aspects may be implemented in firmware or software which may be executed by a controller, microprocessor or other computing device, although embodiments are not limited thereto. While various embodiments may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The embodiments may be implemented by computer software stored in a memory and executable by at least one data processor of the involved entities or by hardware, or by a combination of software and hardware. Further in this regard it should be noted that any of the above procedures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD.

The memory may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may include one or more of general purpose computers, special purpose computers, microprocessors, digital signal processors (DSPs), application specific integrated circuits (ASIC), gate level circuits and processors based on multi-core processor architecture, as non-limiting examples.

Alternatively or additionally some embodiments may be implemented using circuitry. The circuitry may be configured to perform one or more of the functions and/or method steps previously described. That circuitry may be provided in the base station and/or in the communications device.

As used in this application, the term "circuitry" may refer to one or more or all of the following:
(a) hardware-only circuit implementations (such as implementations in only analogue and/or digital circuitry);
(b) combinations of hardware circuits and software, such as:
 (i) a combination of analogue and/or digital hardware circuit(s) with software/firmware and
 (ii) any portions of hardware processor(s) with software (including digital signal processor(s)), software, and memory(ies) that work together to cause an apparatus, such as the communications device or base station to perform the various functions previously described; and
(c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example integrated device.

The foregoing description has provided by way of exemplary and non-limiting examples a full and informative description of some embodiments However, various modifications and adaptations may become apparent to those skilled in the relevant arts in view of the foregoing description, when read in conjunction with the accompanying drawings and the appended claims. However, all such and similar modifications of the teachings will still fall within the scope as defined in the appended claims.

What is claimed is:

1. A system comprising:
 a first apparatus comprising:
  at least one processor; and
  at least one memory including computer program code;
  the at least one memory and the computer program code configured to, with the at least one processor, cause the first apparatus at least to:
   determine power setting adjustments for at least one terminal based on gain setting adjustments for a satellite, wherein the gain setting adjustments for the satellite comprises the following: an uplink gain setting adjustment for the satellite, a downlink gain setting adjustment for the satellite and a difference between an uplink gain setting adjustment for the satellite and a downlink gain setting adjustment for the satellite; and
   provide the power setting adjustments for the at least one terminal to the at least one terminal to a second apparatus,
   wherein the power setting adjustments comprises a power offset adjustment for the at least one terminal and a pathloss offset adjustment for the at least one terminal; and
 the second apparatus comprising:
  a second processor; and
  a second memory including computer program code;

the second memory and the computer program code configured to, with the second processor, cause the second apparatus at least to:
receive, from the first apparatus, the power setting adjustments for the at least one terminal; and
adjust power settings based on the power setting adjustments for the at least one terminal.

2. The system of claim 1, wherein the determining the power setting adjustments for the at least one terminal based on the at least gain setting adjustments is based on information received from the satellite.

3. The system of claim 1, wherein the uplink gain setting adjustment for the satellite comprises an uplink reception gain setting adjustment on an access link and an uplink transmission gain setting adjustment on a feeder link; and wherein the downlink gain setting adjustment for the satellite comprises a downlink reception gain setting adjustment on a feeder link and a downlink transmission gain setting adjustment on an access link.

4. The system of claim 1, wherein the power setting adjustments for the at least one terminal comprises at least one uplink power setting adjustment.

5. The system of claim 1, wherein the power setting adjustments for the at least one terminal is specific for a terminal or generic for a plurality of terminals.

6. The system of claim 1, wherein the power setting adjustments for the at least one terminal is specific for a channel or a reference signal or generic for a plurality of channels and/or a plurality of reference signals.

7. The system of claim 1, wherein the power setting adjustments for the at least one terminal comprises a power offset adjustment for the terminal, a pathloss offset adjustment for the terminal and an information about satellite gain setting adjustment for the terminal.

8. The system of claim 1, wherein the at least one memory and the computer program code are configured to, with the at least one processor, cause the first apparatus at least to:
receive measurements collected at the satellite; and
determine the gain setting adjustments for the satellite based on the measurements.

9. The system of claim 8, wherein the at least one memory and the computer program code are configured to, with the at least one processor, cause the first apparatus at least to:
provide the gain setting adjustments for the satellite to the satellite.

10. The system of claim 1, wherein the first apparatus is a base station.

11. The system of claim 1, wherein the power setting adjustments for the at least one terminal specific for a channel or a reference signal comprises the following: a $P_{0\_PUSCH}$, a $P_{0\_PUCCH}$, a $P_{0\_PRACH}$, and a $P_{0\_SRS}$ parameter adjustments.

12. A method comprising:
determine, by a first apparatus, power setting adjustments for at least one terminal based on gain setting adjustments for a satellite, wherein the gain setting adjustments for the satellite comprises the following: an uplink gain setting adjustment for the satellite, downlink gain setting adjustment for the satellite and a difference between an uplink gain setting adjustment for the satellite and a downlink gain setting adjustment for the satellite, and wherein the power setting adjustments for the at least one terminal specific for a channel or a reference signal comprises the following: a $P_{0\_PUSCH}$, a $P_{0\_PUCCH}$, a $P_{0\_PRACH}$, and a $P_{0\_SRS}$ parameter adjustments;

provide, by the first apparatus to a second apparatus, the power setting adjustments for the at least one terminal to the second apparatus, the power setting adjustments comprising a power offset adjustment for the at least one terminal, a pathloss offset adjustment for the at least one terminal and an information about satellite gain setting adjustment for the at least one terminal;
receiving, by the second apparatus from the first apparatus, the power setting adjustments for the at least one terminal; and
adjusting, by the second apparatus, power settings based on the power setting adjustments for the at least one terminal.

13. The method of claim 12, wherein the power settings for the at least one terminal comprises at least one uplink transmission power setting.

14. The method of claim 12, wherein the power setting adjustments for the at least one terminal is specific for a terminal or generic for a plurality of terminals.

15. The method of claim 12, wherein the power setting adjustments for the at least one terminal is specific for a channel or a reference signal or generic for a plurality of channels and a plurality of reference signals.

16. A system comprising:
a first apparatus comprising:
a first processor; and
a first memory comprising non-transitory computer-readable media that, when executed by the first processor, cause the first processor to perform the following operations:
determine power setting adjustments for at least one terminal based on gain setting adjustments for a satellite, wherein the gain setting adjustments for the satellite comprises the following: an uplink gain setting adjustment for the satellite, a downlink gain setting adjustment for the satellite and a difference between an uplink gain setting adjustment for the satellite and a downlink gain setting adjustment for the satellite, and wherein the power setting adjustments for the at least one terminal specific for a channel or a reference signal comprises the following: a $P_{0\_PUSCH}$, a $P_{0\_PUCCH}$, a $P_{0\_PRACH}$, and a $P_{0\_SRS}$ parameter adjustments; and
provide the power setting adjustments for the at least one terminal to a second apparatus,
wherein the power setting adjustments comprises a power offset adjustment for the at least one terminal and a pathloss offset adjustment for the at least one terminal; and
the second apparatus comprising:
a second processor; and
a second memory comprising non-transitory computer-readable media that, when executed by the second processor, cause the second processor to perform the following operations:
receive, from the first apparatus, the power setting adjustments for the at least one terminal; and
adjust power settings based on the power setting adjustments for the at least one terminal.

17. The system of claim 16, wherein the power setting adjustments comprise a power offset adjustment for the at least one terminal, a pathloss offset adjustment for the at least one terminal and an information about satellite gain setting adjustment for the at least one terminal.

18. The system of claim 16, wherein the determining the power setting adjustments for the at least one terminal based on the gain setting adjustments is based on information received from the satellite.

19. The system of claim 16, wherein the uplink gain setting adjustment for the satellite comprises an uplink reception gain setting adjustment on an access link and an uplink transmission gain setting adjustment on a feeder link; and wherein the downlink gain setting adjustment for the satellite comprises a downlink reception gain setting adjustment on a feeder link and a downlink transmission gain setting adjustment on an access link.

* * * * *